US012436481B2

(12) United States Patent
Shimizu et al.

(10) Patent No.: US 12,436,481 B2
(45) Date of Patent: Oct. 7, 2025

(54) IMAGE FORMING APPARATUS WITH CONTROL OF PLURAL POWER SOURCES

(71) Applicant: CANON KABUSHIKI KAISHA, Tokyo (JP)

(72) Inventors: Yusuke Shimizu, Kanagawa (JP); Tomoo Akizuki, Kanagawa (JP); Norihiro Shirahata, Tokyo (JP); Yusuke Sakamoto, Tokyo (JP); Shunsuke Mizukoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 18/512,820

(22) Filed: Nov. 17, 2023

(65) Prior Publication Data

US 2024/0168405 A1 May 23, 2024

(30) Foreign Application Priority Data

Nov. 18, 2022 (JP) ................................ 2022-185329

(51) Int. Cl.
*G03G 15/02* (2006.01)
*G03G 15/043* (2006.01)
*G03G 15/06* (2006.01)

(52) U.S. Cl.
CPC ....... *G03G 15/065* (2013.01); *G03G 15/0266* (2013.01); *G03G 15/043* (2013.01); *G03G 2215/021* (2013.01)

(58) Field of Classification Search
CPC ............. G03G 15/0266; G03G 15/043; G03G 15/065; G03G 15/1675
See application file for complete search history.

(56) References Cited

U.S. PATENT DOCUMENTS

| | | | | |
|---|---|---|---|---|
| 11,435,675 | B2 * | 9/2022 | Kanai | G03G 15/045 |
| 11,640,123 | B2 | 5/2023 | Shimizu et al. | |
| 12,164,248 | B2 * | 12/2024 | Usui | G03G 15/1675 |
| 12,181,826 | B2 * | 12/2024 | Tokiwa | G03G 21/0064 |

FOREIGN PATENT DOCUMENTS

| | | | |
|---|---|---|---|
| JP | 2001-051458 | A | 2/2001 |
| JP | 2020-160361 | A | 10/2020 |
| JP | 2022-114924 | A | 8/2022 |
| JP | 2022-169235 | A | 11/2022 |

* cited by examiner

*Primary Examiner* — Hoang X Ngo
(74) *Attorney, Agent, or Firm* — Venable LLP

(57) ABSTRACT

In an image forming apparatus, rotation of an image bearing member is started and stopped in a contact state between the image bearing member and a developing member. During a post-rotation operation, a controller ends application of a charging voltage after changing the charging voltage stepwisely to first and second charging voltages. The controller ends application of a developing voltage after changing the developing voltage stepwisely at a developing position to first and second developing voltages in synchronism with the first and second charging voltages. A potential difference between each of surface potentials of first and second regions and an associated one of the first and second developing voltages is maintained within a predetermined range. The controller carries out control so that an absolute value of the surface potential of at least one of the first and second regions is made low by passing a current under application of a transfer voltage.

10 Claims, 16 Drawing Sheets

IMAGE FORMING APPARATUS WITH CONTROL OF PLURAL POWER SOURCES

FIELD OF THE INVENTION AND RELATED ART

The present invention relates to an image forming apparatus, such as a laser printer, a copying machine, or a facsimile apparatus, of an electrophotographic recording type.

In the image forming apparatus such as the laser printer of the electrophotographic type, a surface of a photosensitive member as an image bearing member is electrically charged uniformly by a charging member, and is exposed to light by an exposure device, so that an electrostatic latent image is formed on the photosensitive member. This electrostatic latent image is developed by being supplied with toner as a developer by a developing device, so that a toner image is formed on the photosensitive member. Then, this toner image is transferred onto a recording material, passing through a transfer portion, by a transfer member forming the transfer portion in contact with the photosensitive member. During transfer, to the transfer member, a transfer voltage is applied. As the photosensitive member, a photosensitive drum is used in many cases. As the developing device, a developing device provided with a developing roller as a developing member for carrying and feeding (conveying) the toner is used in many cases. In the following, an image forming apparatus including the photosensitive drum as the photosensitive member and the developing roller as the developing member will be described as an example. Incidentally, for convenience, magnitudes (high/low) of a voltage and a potential refer to magnitudes (high/low) when values thereof are compared with each other in terms of an absolute value unless otherwise mentioned specifically.

As the image forming apparatus described above, there is an image forming apparatus employing a contact developing type method. In the image forming apparatus employing the contact developing type method, the developing roller contacts the photosensitive drum during an image forming operation. On the other hand, there is an image forming apparatus in which the developing roller is separated from the photosensitive drum in a period from a start of a pre-rotation operation before the image forming operation to a start of the image forming operation and a period from an end of the image forming operation to an end of a post-rotation operation. However, when a developing contact and separation mechanism for causing the developing roller to contact the photosensitive drum and to be separated from the photosensitive drum is provided, there arises a problem such that a constitution of the image forming apparatus is complicated and upsized. For that reason, in recent years, in order to simplify and downsize the constitution of the image forming apparatus, a constitution in which the developing contact and separation mechanism is not provided is employed in some instances.

In the constitution in which the developing contact and separation mechanism is not provided, the developing roller and the photosensitive drum are always in a contact state, and therefore, compared with the constitution in which the developing contact and separation mechanism is provided, a fog is liable to occur. The fog is a phenomenon that the toner is transferred and deposited from the developing roller onto a non-image portion of the photosensitive drum. For that reason, particularly, as in the constitution in which the developing contact and separation mechanism is not provided, in a constitution in which the developing roller and the photosensitive drum are shifted from a contact and rotation state to a rest state in a period until the post-rotation operation is ended, it is desired that this fog is suppressed. However, irrespective of provision or non-provision of the developing contact and separation mechanism, in the constitution in which the photosensitive drum and the developing roller are rotated in contact with each other and the rotation is stopped during a non-image forming operation, the fog is liable to occur, and therefore, it is desired that this fog is suppressed.

To the developing roller, a developing voltage is applied. As regards the occurrence of the fog, contribution of a back contrast Vback which is a potential difference between a non-image portion potential on the photosensitive drum and the developing voltage in a developing portion where the developing roller and the photosensitive drum are in contact with each other is large. In the case where the Vback is small, the potential difference between the non-image portion potential on the photosensitive drum and the developing voltage is small, and therefore, a force for electrically attracting toner of a normal polarity in a direction from the photosensitive drum toward the developing roller is weak. For that reason, the toner is transferred to the non-image portion of the photosensitive drum. On the other hand, in the case where the Vback is large, the potential difference between the non-image portion potential on the photosensitive drum and the developing voltage is large, and therefore, the force for electrically attracting the toner of the normal polarity in the direction from the photosensitive drum toward the developing roller is strong. However, then again, toner charged to an opposite polarity to the normal polarity (reversed toner) is transferred onto the non-image portion of the photosensitive drum in some instances. Accordingly, the Vback is controlled to an appropriate range, whereby the fog is suppressed, so that toner consumption due to the fog can be suppressed.

In Japanese Laid-Open Patent Application (JP-A) 2020-160361, the following method is disclosed as a method for suppressing the fog in a constitution in which the developing roller and the photosensitive drum are rotated in contact with each other and in which the rotation is stopped even in a period other than during the image forming operation (i.e., during non-image forming operation). During the post-rotation operation, a surface potential of the photosensitive drum is dropped to 0 V, and in addition, at the time of a start of the post-rotation operation, a voltage of the opposite polarity to the normal polarity of the toner is applied to the developing roller. Thereafter, a charging voltage and the developing voltage are increased to voltages during the image forming operation, so that the fog during the pre-rotation operation is suppressed. Further, in the method disclosed in JP-A 2020-160361, during the pre-rotation operation, control of a laser light quantity of an exposure device is carried out in order that the Vback is not out of a predetermined range due to a difference in raising characteristic between a charging power source and a developing power source. Further, during the post-rotation operation, control of the laser light quantity of the exposure device is carried out in order that the Vback is not out of a predetermined range due to a difference in falling characteristic between the charging power source and the developing power source.

However, in the method disclosed in JP-A 2020-160361, during the post-rotation operation, not only a target voltage of the charging power source is abruptly dropped from a target voltage during the image forming position to 0 V, but also the developing voltage and the laser light quantity are controlled, so that the Vback is intended to fall within the predetermined range. For that reason, it is difficult to adjust the developing voltage and the laser light quantity for maintaining the Vback within the predetermined range in conformity with the falling of the charging power source. Further, in the method disclosed in JP-A 2020-160361, in order to maintain the Vback within the predetermined range, there is a need to use a low laser light quantity. For that reason, a BD signal used in control of a rotational speed of a polygon mirror of the exposure device (laser scanner) cannot be properly detected, so that there is a possibility that control of the exposure device becomes difficult. Further, in the method disclosed in JP-A 2020-160361, there is a need that the surface of the photosensitive drum is electrically discharged by a pre-exposure device, so that the discharge of the photosensitive drum surface can become a factor hindering downsizing and cost reduction of the image forming apparatus.

For that reason, a new method capable of suppressing the fog during the post-rotation operation while improving at least a part of hindrances to the downsizing and the cost reduction of the image forming apparatus, complicated control, and difficulty in stable control is required.

SUMMARY OF THE INVENTION

A principal object of the present invention is to provide an image forming apparatus capable of suppressing a fog during a post-rotation operation in a constitution in which an image bearing member and a developing member are rotated in contact with each other and in which the rotation is stopped during a non-image forming operation.

This object is accomplished by an image forming apparatus according to the present invention.

An aspect of the present invention is to provide an image forming apparatus comprising: a rotatable image bearing member; a charging member configured to electrically charge a surface of the image bearing member to a predetermined polarity at a charging position; a developing member contacting the surface of the image bearing member and configured to form a toner image by supplying toner to the surface of the image bearing member at a developing position downstream of the charging position with respect to a rotational direction of the image bearing member; a transfer member contacting the surface of the image bearing member and configured to transfer the toner image from the image bearing member onto a recording material at a transfer position downstream of the developing position and upstream of the charging position with respect to the rotational direction of the image bearing member; a charging voltage applying portion configured to apply a charging voltage of the same polarity as the predetermined polarity to the charging member; a developing voltage applying portion configured to apply a developing voltage to the developing member; a transfer voltage applying portion configured to apply a transfer voltage of an opposite polarity to the predetermined polarity to the transfer member; and a controller configured to control the charging voltage applying portion, the developing voltage applying portion, and the transfer voltage applying portion, wherein the controller carries out control so as to be capable of executing an image forming operation in which rotation of the image bearing member is started and stopped in a state that the developing member contacts the image bearing member and in which the toner image transferred onto the recording material is formed and executing a post-rotation operation until the rotation of the image bearing member after the image forming operation is ended is stopped, and wherein during the post-rotation operation, the controller controls the charging voltage applying portion so that the charging voltage is changed stepwise to a first charging voltage smaller in absolute value than the charging voltage during the image forming operation and then to a second charging voltage smaller in absolute value than the first charging voltage, and thereafter application of the charging voltage is ended, and when regions of the surface of the image bearing member that have passed through the charging position under application of the first charging voltage and the second charging voltage are a first region and a second region, respectively, the controller ends application of the developing voltage after changing the developing voltage to a first developing voltage when the first region first passes through the developing position and to a second developing voltage when the second region first passes through the developing position, the controller controls the developing voltage applying portion so that a potential difference between a surface potential of the first region when the first region first passes through the developing position and the first developing voltage and a potential difference between a surface potential of the second region when the second region first passes through the developing position and the second developing voltage are maintained within a predetermined range, and the controller controls the transfer voltage applying portion so that a current flows between the transfer member and the image bearing member under application of the transfer voltage when each of the first region and the second region first passes through the transfer position and so that an absolute value of a surface potential of the image bearing member is made small when at least one of the first region and the second region first passes through the transfer position.

Further features of the present invention will become apparent from the following description of exemplary embodiments with reference to the attached drawings.

DESCRIPTION OF THE EMBODIMENTS

In the following, an image forming apparatus according to the present invention will be described specifically with reference to the drawings. However, materials, shapes, a relative arrangement, and the like of constituent parts described in the following embodiments should be appropriately changed depending on constitutions and various conditions of apparatuses (devices) to which the present invention is applied, and a scope of the present invention is not intended to be limited to the following embodiments.

1. GENERAL STRUCTURE AND OPERATION OF IMAGE FORMING APPARATUS

Figure 1:
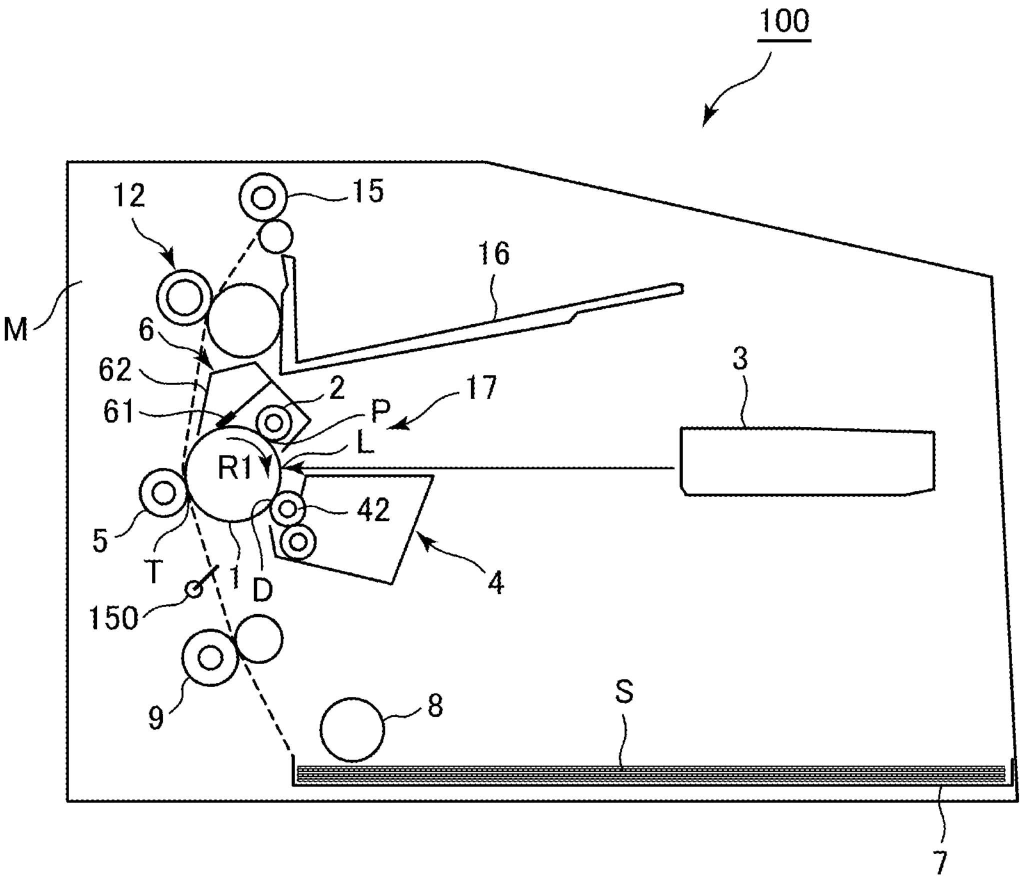
FIG. 1 is a schematic sectional view of an image forming apparatus.

FIG. 1 is a schematic sectional view of an image forming apparatus 100 of this embodiment. The image forming apparatus 100 of this embodiment is a monochromatic laser printer of an electrophotographic type.

The image forming apparatus 100 includes a photosensitive drum 1 which is a rotatable drum-shaped (cylindrical) photosensitive member as an image bearing member. The photosensitive drum 1 is rotatably supported. When a print start signal (image formation start signal) is inputted to the image forming apparatus 100, the photosensitive drum 1 is rotationally driven at a predetermined peripheral speed in an arrow R1 direction (clockwise direction) in FIG. 1 by a main motor 10 (FIG. 2) as a driving source constituting a driving means. In this embodiment, a process speed of the image forming apparatus 100 corresponding to the peripheral speed of the photosensitive drum 1 is 250 mm/s.

At a periphery of the photosensitive drum 1, along a rotational direction of the photosensitive drum 1, a charging roller 2, an exposure device 3, a developing device 4, a transfer roller 5, and a cleaning device 6 are sequentially provided in a named order. Further, at a lower portion of an apparatus main assembly M of the image forming apparatus 100, a cassette 7 accommodating recording materials S is provided, and along a feeding passage of the recording material S from the cassette 7, a feeding roller 8, a conveying roller 9, a registration sensor 150, a fixing device 12, a discharging roller 15, and a discharging tray 16 are provided in a named order.

A surface of a rotating photosensitive drum 1 is electrically charged uniformly to a predetermined polarity (negative polarity in this embodiment) and a predetermined potential by the charging roller 2 which is a roller-type charging member as a charging means. The charging roller 2 forms a charging portion (charging negative) in contact with the photosensitive drum 1. During the charging, to the charging roller 2, a predetermined charging voltage (charging bias) which is a DC voltage of the same polarity (negative polarity in this embodiment) as a charge polarity of the photosensitive drum 1 is applied by a charging power source (high-voltage power source) 11 (FIG. 2) as a charging voltage applying means. The charged surface of the photosensitive drum 1 is subjected to scanning exposure by an exposure device 3 as an exposure means depending on an image signal (image information) inputted to the image forming apparatus 100, so that an electrostatic latent image (electrostatic image) is formed on the photosensitive drum 1. The exposure device will be further described specifically later. The electrostatic latent image is developed (visualized) by being supplied with toner as a developer by a developing device 4 as a developing means, so that a toner image (developer image) is formed on the photosensitive drum 1. A developing roller 42 provided in the developing device 4 forms a developing portion (developing nip) D in contact with the photosensitive drum 1. The developing device 4 will be further described specifically later.

A transfer roller 5 which is a roller-type transfer member as a transfer means is provided opposed to the photosensitive drum 1. The transfer roller 5 is pressed toward the photosensitive drum 1 and forms a transfer portion (transfer negative) T where the photosensitive drum 1 and the transfer roller 5 are in contact with each other. In the transfer portion T, the toner image formed on the photosensitive drum 1 is transferred onto a recording material S nipped and fed by the photosensitive drum 1 and the transfer roller 5. During the transfer, to the transfer roller 5, a predetermined transfer voltage (transfer bias) which is a DC voltage of an opposite polarity (positive polarity in this embodiment) to a normal polarity of the toner is applied by a transfer power source (high-voltage power source) 14 (FIG. 2) as a transfer voltage applying means (transfer voltage applying portion).

The recording material (recording medium, transfer material, sheet) S such as paper is accommodated in the cassette 7 as a recording material accommodating portion. The recording material S accommodated in the cassette 7 is separated and fed one by one from the cassette 7 by the feeding roller 8 and is conveyed toward the conveying roller 9. This recording material S is supplied to the transfer portion T by the conveying roller 9 so as to be timed to the toner image on the photosensitive drum 1. Incidentally, in this embodiment, with respect to a feeding direction of the recording material S, between the conveying roller 9 and the transfer portion T, as a recording material detecting means for detecting the recording material S, the registration sensor 150 for detecting a leading end of the recording material S with respect to the feeding direction is provided. A signal indicating a detection result of the registration sensor 150 is inputted to an engine controller 205 (FIG. 2) (described later), and is used for control of an image writing timing by the exposure device 3, or the like. Further, the recording material S on which the toner image is transferred is conveyed to the fixing device 12 as a fixing means. The fixing device 12 fixes (melts, sticks) the toner image on the recording material S by heating and pressing the recording material S on which an unfixed toner image is carried. The recording material S on which the toner image is fixed is discharged (outputted) onto the discharge tray 16 as a discharge portion provided outside the apparatus main assembly M, by the discharging roller 15 as a conveying member.

The toner (transfer residual toner) remaining on the photosensitive drum 1 after the transfer of the toner image onto the recording material S is removed and collected from the surface of the photosensitive drum 1 by the cleaning device 6 as a cleaning means. The cleaning device 6 includes a cleaning blade 61 as a cleaning member provided so as to contact the surface of the photosensitive drum 1 and includes a residual toner container 62. Further, the cleaning device 6 scrapes off the transfer residual toner from the surface of the rotating photosensitive drum 1 and collects the transfer residual toner in the residual toner container 62 by the cleaning blade 61.

Figure 8:
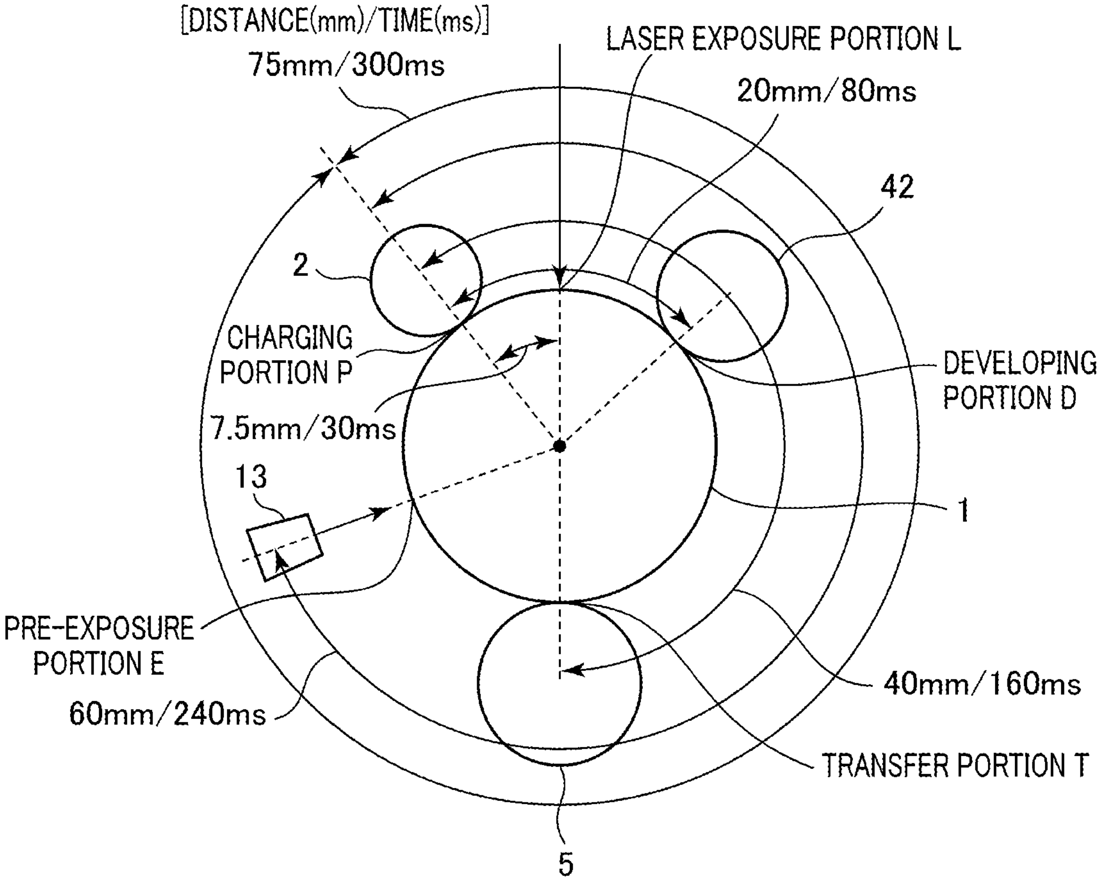
FIG. 8 is a schematic view showing a positional relationship between portions around a photosensitive drum.

Here, with respect to a rotational direction of the photosensitive drum 1, a position on the photosensitive drum 1 where the charging roller 2 charges the photosensitive drum 1 is a charging position. The charging roller 2 charges the photosensitive drum 1 by electric discharge generating in at least one of minute gaps between the photosensitive drum 1 and the charging roller 2 on sides upstream and downstream of a contact portion between the photosensitive drum 1 and the charging roller 2 with respect to the rotational direction of the photosensitive drum 1. However, for simplification, herein, description will be made by regarding the contact portion on the photosensitive drum 1 with the charging roller 2 as the charging position (charging portion) P. Further, with respect to the rotational direction of the photosensitive drum 1, a position on the photosensitive drum 1 irradiated with laser light by the exposure device 3 is an exposure position (exposure portion) L. Further, with respect to the rotational direction of the photosensitive drum 1, a position on the photosensitive drum 1 (a contact portion on the photosensitive drum 1 with the developing roller 42 in this embodiment) where the toner is supplied by the developing roller 42 is a developing position (developing portion) D. Further, with respect to the rotational direction of the photosensitive drum 1, a position on the photosensitive drum 1 (a contact portion on the photosensitive drum 1 with the transfer roller 5 in this embodiment) where the toner image is transferred onto the recording material S is a transfer position (transfer portion) T. Incidentally, each of the positions of the charging portion P, the exposure portion (laser exposure portion) L, the developing portion D, and the transfer portion T is represented by a center position with respect to the rotational direction of the photosensitive drum 1. In this embodiment, the image forming apparatus 100 does not include a discharging device (pre-exposure device or the like) for discharging the surface of the photosensitive drum 1 on a side downstream of the transfer portion T and upstream of the charging portion P with respect to the rotational direction of the photosensitive drum 1. FIG. 8 is a schematic view showing a positional relationship of the respective portions around the photosensitive drum 1 in this embodiment. The positional relationship of the respective portions around the photosensitive drum 1 in this embodiment will be further described specifically later in conjunction with a print sequence. Incidentally, in FIG. 8, a pre-exposure portion E in a comparison example (described later) is also shown, but as described above, the image forming apparatus 100 of this embodiment does not include the pre-exposure device.

In this embodiment, the photosensitive drum 1, and as process means, the charging roller 2, the developing device 4, and the cleaning device 6 are integrally assembled into a cartridge and constitute a process cartridge 17 detachably mountable to the apparatus main assembly M. Incidentally, the apparatus main assembly M of the image forming apparatus 100 is a portion such that the process cartridge 17 is removed from the image forming apparatus 100.

Figure 2:
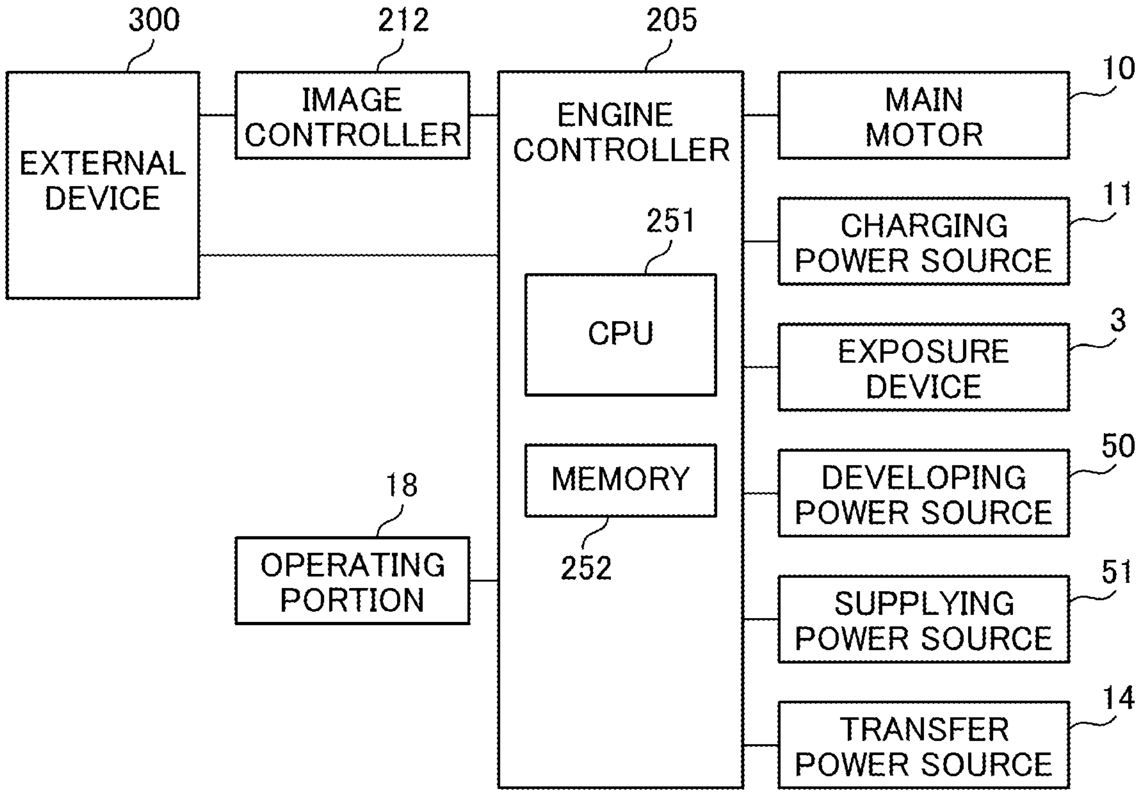
FIG. 2 is a schematic block diagram showing a control constitution of the image forming apparatus.

FIG. 2 is a schematic block diagram showing a control mode of the image forming apparatus 100 of this embodiment. The image forming apparatus 100 is provided with the engine controller 205 as a control means. The engine controller 205 is constituted by including a CPU 251 as an operation processing means which is a central element for performing operation processing, a memory (storing medium) 252, such as ROM, RAM or a nonvolatile memory, as a storing means, an input/output portion (not shown), and the like. In the ROM, a control program, a data table acquired in advance, and the like are stored, and in the RAM, information on detection results of various sensors, operation (calculation) results, and the like are stored. In the nonvolatile memory, various pieces of setting information, information on a lifetime of each of members, and the like are stored. The input/output portion (I/F) transfers signals between the engine controller 205 and an external device.

To the engine controller 205, for example, a main motor 10, the charging power source 11, a developing power source 50 (described later), a supplying power source 51 (described later), the exposure device 3, the transfer power source 14, and the like are connected, and are operated by being controlled by the engine controller 205. Incidentally, each of the charging power source 11, the developing power source 50, the supplying power source 51, and the transfer power source 14 is constituted by including an associated transformer and the like.

The engine controller 205 integrally controls the respective portions of the image forming apparatus 100 in accordance with the control program or the data table and causes the portions to perform a sequence operation. To the engine controller 205, a control instruction such as an image signal, a print start signal, and the like is inputted from an external device (host device) 300 such as personal computer (host computer), an image reading device or the like, and in accordance with this, the engine controller 205 controls the respective portions of the image forming apparatus 100 and causes the image forming apparatus to execute an image forming operation. Further, to the engine controller 205, an operating portion (operation panel) 18 provided in the image forming apparatus 100 may be connected. The operating portion 18 is constituted by including a display portion such as a liquid crystal display for displaying information to an operator such as a user or a service person under control of the engine controller 205 and by including an input portion such as keys for inputting information to the engine controller 205 in response to an operation by the operator.

2. DEVELOPING DEVICE

Figure 3:
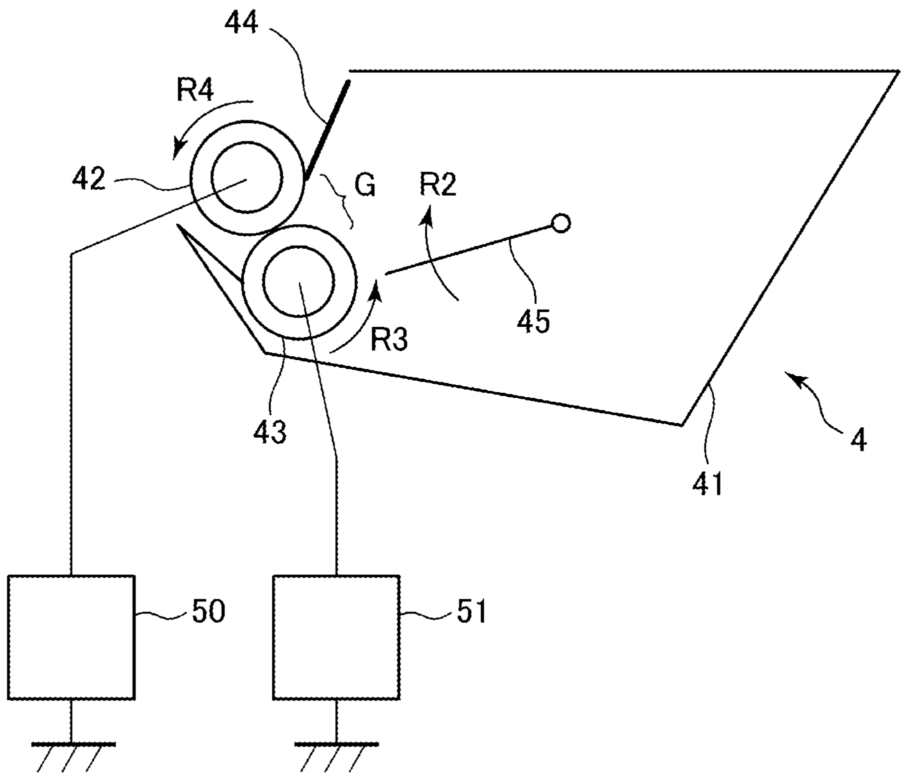
FIG. 3 is a schematic sectional view of a developing device.

FIG. 3 is a schematic sectional view of the developing device 4 in this embodiment. In this embodiment, the developing device 4 employs a contact development type method, and uses, as the developer, a negatively chargeable non-magnetic one-component developer (toner) of which normal polarity (charge polarity of the toner during the development) is the negative polarity. Further, in this embodiment, the developing device 4 employs a reverse development type method in which development is carried out by depositing the toner, charged to the same polarity (negative polarity in this embodiment) as the charge polarity of the photosensitive drum 1, on an image portion on the photosensitive drum 1 lowered in potential by being exposed to laser after being charged uniformly.

The developing device 4 includes a developing container 41 as a developer accommodating portion for accommodating the toner, and the developing roller 42 as a developing member (developer carrying member) for carrying and conveying the toner. Further, the developing device 4 includes a supplying roller 43 as a developer supplying member for supplying the toner to the developing roller 42, and a developing blade 44 as a developer regulating member for regulating the toner carried by the developing roller 42. The supplying roller 43 and the developing blade 44 are disposed so as to contact the developing roller 42. Further, in the developing container 41 (at a substantially central portion in this embodiment), a stirring member 45 for stirring the toner and supplying the toner to the supplying roller 43 is provided. To the developing roller 42, the developing power source (high-voltage power source) 50 as a developing voltage applying means (developing voltage applying portion) is connected. Further, to the supplying roller 43, a supplying power source (high-voltage power source) 51 as a supplying voltage applying means (supplying voltage applying portion) is connected.

In this embodiment, the image forming apparatus 100 is not provided with a developing contact and separation mechanism for permitting contact of the developing roller 42 to the photosensitive drum 1 and separation of the developing roller 42 from the photosensitive drum 1. That is, in this embodiment, the developing roller 42 always contacts the photosensitive drum 1 in a state the developing device 4 (process cartridge 17) is disposed at a predetermined position in the apparatus main assembly M. The developing roller 42 is rotationally driven in an arrow R4 direction (counterclockwise direction) in FIG. 3. That is, in a contact portion between the photosensitive drum 1 and the developing roller 42, the developing roller 42 is rotationally driven so that the surface of the photosensitive drum 1 and a surface of the developing roller 42 move in a forward direction. Further, the supplying roller 43 is rotationally driven in an arrow R3 direction (counterclockwise direction) in FIG. 3. That is, in a contact portion between the developing roller 42 and the supplying roller 43, the supplying roller 43 is rotationally driven so that the surface of the developing roller 42 and a surface of the supplying roller 43 move in opposite directions. Further, the stirring member 45 is rotationally driven in an arrow R2 direction (clockwise direction) in FIG. 3. In this embodiment, the developing roller 42, the supplying roller 43, and the stirring member 45 are rotated by transmitting a driving force thereto from the main motor 10 which is a driving source common to the main motor 10 and the above-described members 42, 43, and 45. The developing roller 42, the supplying roller 43, and the stirring member 45 are rotated in synchronism with the photosensitive drum 1, and rotations of these members are stopped in synchronism with the rotation of the photosensitive drum 1. During development, to the developing roller 42, a developing voltage (developing bias) which is a DC voltage of the same polarity (negative polarity in this embodiment) as the normal polarity of the toner is applied by the developing power source 50. Further, during the development, to the supplying roller 43, a supplying voltage (supplying bias) which is a DC voltage, larger in absolute value than the developing voltage, of the same polarity (negative polarity in this embodiment) as the normal polarity of the toner is applied by the supplying power source 51.

A developing operation of the developing device 4 will be described. By the rotation of the stirring member 45, the toner is supplied to a region G in the neighborhood of the contact portion between the developing roller 42 and the supplying roller 43, and then once stored in the region G. The toner stored in the region G is supplied to the developing roller 42 so as to be carried on the developing roller 42 by the rotation of the supplying roller 43. The toner supplied to the developing roller 42 passes through a contact portion between the developing roller 42 and the developing blade 44 and is formed in a layer (coated) in an appropriate thickness by the rotation of the developing roller 42. Further, at this time, the toner supplied to the developing roller 42 rubs with the surface of the developing blade 44, and thus is triboelectrically charged to the negative polarity. The toner coated on the developing roller 42 is conveyed to the developing portion D which is the contact portion between the photosensitive drum 1 and the developing roller 42 by the rotation of the developing roller 42. At the developing portion D, a part of the toner coated on the developing roller 42 is transferred and deposited on the photosensitive drum 1 by an electric field formed by a potential difference between a potential of the image portion of the electrostatic latent image formed on the photosensitive drum 1 and the developing voltage applied to the developing roller 42. Thus, the electrostatic latent image is developed (visualized) into a toner image. The toner remaining on the developing roller 42 without being used for development at the developing portion D is scraped off from the surface of the developing roller 42 by the rotating supplying roller 43 at the contact portion between the developing roller 42 and the supplying roller 43, and then the toner stored in the region G is newly supplied to the surface of the developing roller 42.

A potential relationship around the photosensitive drum 1 during the image forming operation will be described. In this embodiment, during the image forming operation, a charging voltage of −1000 V is applied to the charging roller 2, so that the surface of the photosensitive drum 1 is charged uniformly to a dark-portion potential (non-image portion potential, charge potential) Vd of −500 V.

The charged surface of the photosensitive drum 1 is exposed to light by the exposure device 3 after an exposure amount and an exposure region are determined depending on an image signal, so that a light-portion potential (image portion potential) V1 of −200 V is formed. In this embodiment, the exposure amount of the exposure device 3 for forming the light-portion potential V1 is set at 0.2 $\mu J/cm^2$. Further, during the image forming operation, to the developing roller 42, a developing voltage Vdc of −350 V is applied. An image forming portion and a non-image forming portion are formed in an image forming region (image formable region) on the photosensitive drum 1. The image forming region is a region in which the toner is capable of being supplied from the surface of the developing roller 42 to the surface of the photosensitive drum 1 and in which the toner is capable of being carried on the developing roller 42. In this embodiment, a developing contrast Vcont which is a potential difference between the light-portion potential V1 and the developing voltage Vdc on the photosensitive drum 1 in the developing portion D is 150 V (the developing voltage Vdc is higher than the light-portion potential V1 on a normal polarity side of the toner). Further, in this embodiment, a back contrast Vback which is a potential difference between the dark-portion potential Vd and the developing voltage Vdc on the photosensitive drum 1 in the developing portion D is 150 V (the dark-portion potential Vd is higher than the developing voltage Vdc on the normal polarity side of the toner). Incidentally, each of Vcont and Vback is represented by a potential difference between a surface potential of the photosensitive drum 1 in the developing portion D and the developing voltage applied to a core metal of the developing roller 42. Further, the voltage is represented by a potential difference with a ground potential (0 V).

Here, a relationship between Vback and fog will be described. By appropriately controlling Vback, excessive toner is prevented from being deposited on a non-image portion (white background portion) where the toner image is not formed. This excessive toner is referred to as fog toner, and a phenomenon that the fog toner occurs is referred to as a fog. In the case where Vback is smaller than a predetermined range, an electric field in which the toner charged to the negative potential which is the normal polarity in this embodiment is retained on the developing roller 42 is weakened, so that the fog occurs in the non-image portion on the photosensitive drum 1. On the other hand, when Vback is larger than the predetermined range, a fog such that toner (reversal toner) charged to a positive polarity which is a polarity opposite to the normal polarity on the developing roller 42 is deposited in the non-image portion on the photosensitive drum 1 occurs. A fog such that the toner charged to the negative polarity which is the normal polarity is deposited in the non-image portion on the photosensitive drum 1 is also referred to as a normal fog.

Further, the fog such that the toner charged to the positive polarity opposite to the normal polarity is deposited in the non-image portion on the photosensitive drum 1 is also referred to as a reversed fog. When the fog occurs during the image forming operation, a color tint occurs in a non-image portion of the recording material S, so that an image defect occurs. On the other hand, in the case where the fog occurs during a period (during a non-image forming operation) other than during the image forming operation, the fog toner is scraped off by a cleaning blade 61 and is collected in a residual toner container 62, and therefore, the toner is consumed unnecessarily.

Figure 4:
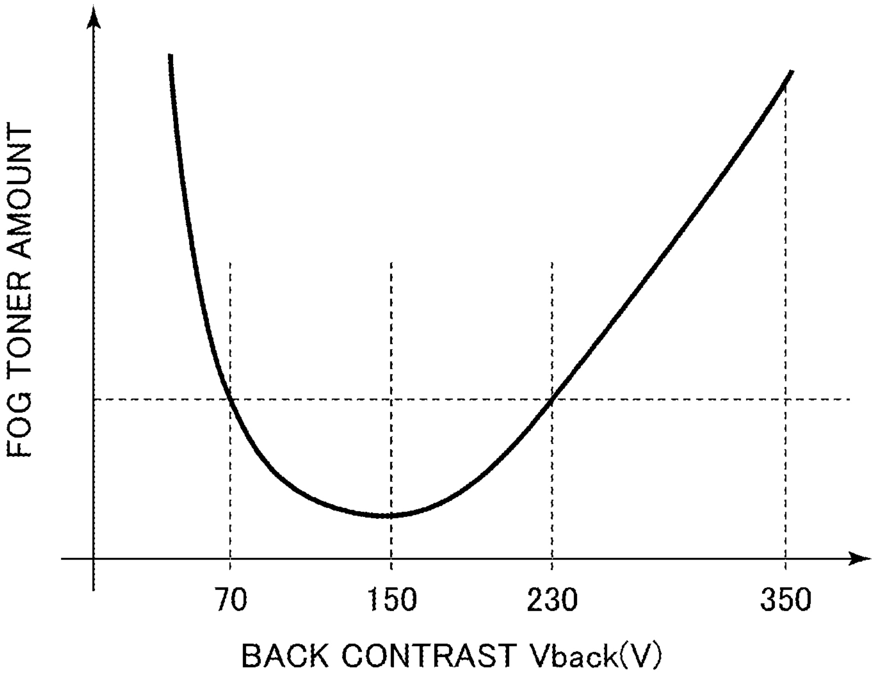
FIG. 4 is a graph showing an example of a relationship between Vback and a fog toner amount.

FIG. 4 is a graph showing an example of a relationship between Vback and a fog toner amount. In FIG. 4, an abscissa represents Vback, and an ordinate represents the fog toner amount. The fog toner amount was acquired by measuring a density by a reflection densitometer ("TC-6DS/A", manufactured by Tokyo Denshoku Co., Ltd.) after removing the toner from the surface of the photosensitive drum 1 with a Mylar™ tape by taping and then applying the tape onto reference paper. Further, the relationship between Vback and the fog toner amount was acquired by performing an image forming operation (formation of a solid white image) without using the recording material S in the image forming apparatus 100 and then measuring a toner amount on the photosensitive drum 1 in the above-described manner while changing Vback at that time. When the fog toner amount is a predetermined amount or less, the fog is not readily recognized visually. Further, when the fog toner amount increases, a toner consumption amount becomes large, and therefore, it is desired that the fog toner amount is as small as possible. As described above, to the occurrence of the fog, contribution on Vback is large. As shown in FIG. 4, in the case where Vback is small, there is a tendency that the fog toner amount due to the normal fog increases. On the other hand, in the case where Vback is large, there is a tendency that the fog toner amount due to the reversed fog increases. Accordingly, by controlling Vback to an appropriate range, the fog is suppressed, so that the toner consumption due to the fog can be suppressed. In this embodiment, as shown in FIG. 4, by setting Vback within a range from 70 V to 230 V, the fog toner is not readily recognized visually, so that the toner consumption can be sufficiently suppressed. Further, preferably, by setting Vback within a range from 100 V to 200 V, the fog toner is not readily further recognized visually, so that the toner consumption can be further suppressed. For that reason, in this embodiment, Vback is set at 150 V so that the fog toner amount becomes minimum. That is, in this embodiment, Vback may preferably be made, as within a predetermined range, within a range of ±80 V with respect to a Vback at which the fog toner amount becomes minimum, preferably within a range of ±50 V with respect to the Vback.

3. EXPOSURE DEVICE

Figure 5:
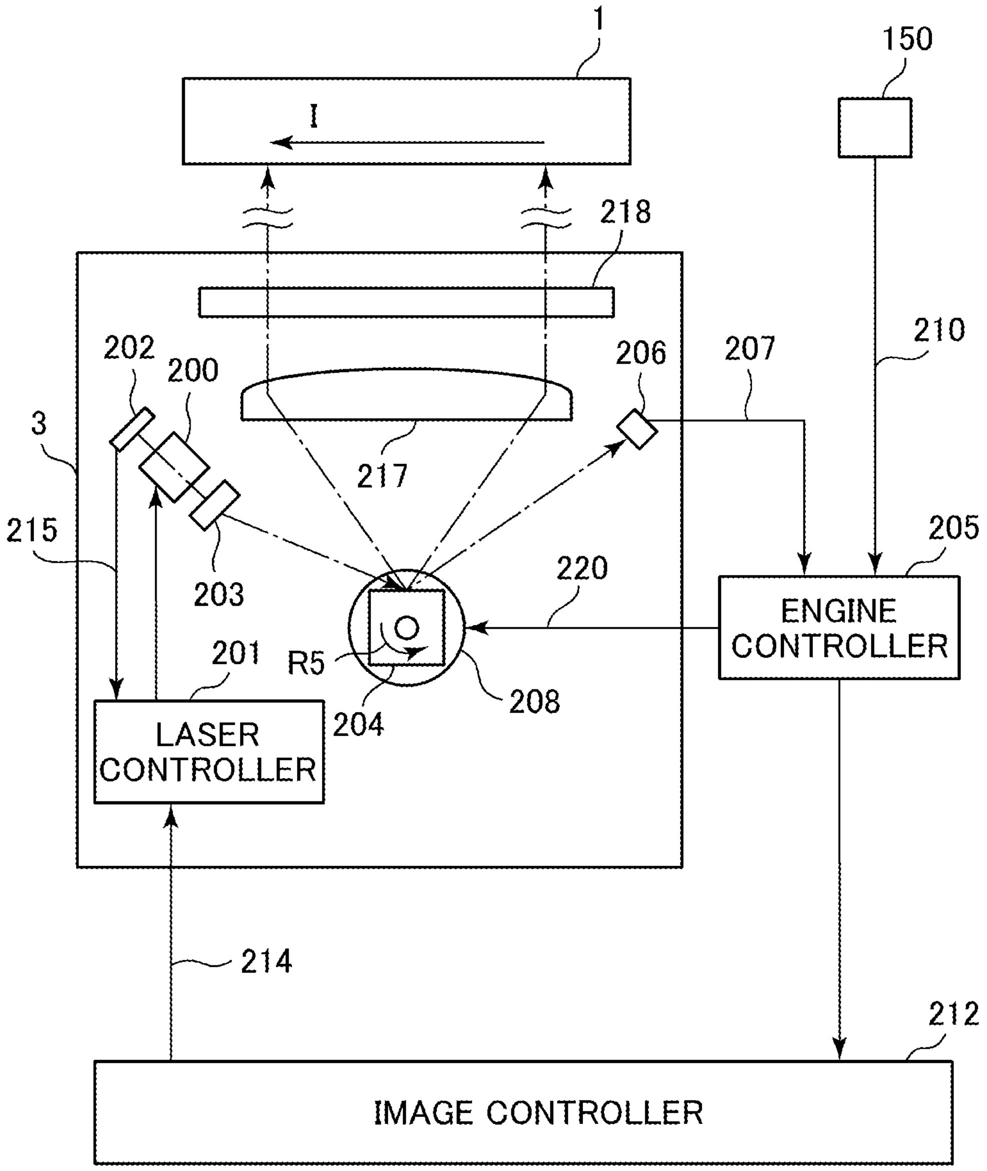
FIG. 5 is a schematic view of an exposure device.

FIG. 5 is a schematic view showing a structure of the exposure device 3 and a periphery thereof in this embodiment. In this embodiment, the exposure device 3 is constituted by a laser scanner.

To the exposure device 3, the engine controller 205 and an image controller 212 are connected. The engine controller 205 and the image controller 212 control an operation of the exposure device 3. The exposure device 3 includes a laser light source 200, a collimator lens 203, a polygon mirror 204, a photodiode (PD) 202, a beam detection (BD: Beam Detection) sensor 206, an f-θ lens 217, and a fold-back mirror 218. Further, the exposure device 3 includes a laser controller 201 for carrying out light emission control of the laser light source 200 depending on an image data signal 214 inputted from the image controller 212. On the basis of an image signal inputted from the external device 300 (FIG. 2), the image controller 212 performs processing for generating an image data signal 214 for carrying out the light emission control of the exposure device 3, or the like.

The laser light source 200 emits laser light in two directions by a light-emitting element. Laser light emitted in one direction from the laser light source 200 enters the photodiode 202. The photodiode 202 converts the incident light into an electric signal and sends as a PD signal 215 to the laser controller 201. On the basis of the PD signal, the laser controller 201 carries out output light quantity control (APC: Auto Power Control) of the laser light source 200 so that the laser light has a predetermined light quantity. Laser light emitted in the other direction from the laser light source 200 is irradiated to the polygon mirror 204 via the collimator lens 203. The polygon mirror 204 is a rotatable polygonal mirror which has a plurality of reflection surfaces and which is rotationally driven in an arrow R5 direction (counterclockwise direction) in FIG. 5 by a polygon (mirror) motor 208. The polygon mirror 204 in this embodiment has four reflection surfaces (faces). The polygon motor 208 rotationally drives the polygon mirror 204 depending on a driving signal 220 outputted from the engine controller 205. When a print start signal is inputted from the external device 300 (FIG. 2) to the engine controller 205, the engine controller 205 starts a print sequence as (described later), so that the engine controller 205 starts not only rotational drive of the photosensitive drum 1 and the like but also rotational drive of the polygon mirror 204. The laser light irradiated to the polygon mirror 204 is deflected in a direction of the photosensitive drum 1 by the reflection surface. By the rotation of the polygon mirror 204, a deflection angle changes. By this change in deflection angle, the surface of the photosensitive drum 1 is scanned with the laser light with respect to an arrow I direction (direction substantially perpendicular to a movement direction of the surface of the photosensitive drum 1) in FIG. 5. This laser light is corrected in optical path by the f-θ lens 217 so as to scan the photosensitive drum 1 at a constant speed, and the photosensitive drum 1 is irradiated with the laser light via the fold-back mirror 218.

The laser light deflected by the polygonal mirror 204 is partially received by the BD sensor 206. In this embodiment, the BD sensor 206 is disposed at a position where the laser light is capable of being detected before the scanning of the photosensitive drum 1 with the laser light is started. On the basis of the detected laser light, the BD sensor 206 generates a BD signal 207 having a first level and a second level, and sends the BD signal 207 to the engine controller 205. The BD signal 207 is, for example, a negative logic signal, and is a detection signal such that the level thereof is the first level (Low) during detection of the laser light by the BD sensor 206 and is the second level (High) during non-detection of the laser light by the BD sensor 206. On the basis of the acquired BD signal 207, the engine controller controls the polygon motor 208 so that a rotation period of the polygon mirror 204 becomes a predetermined period.

The engine controller 205 discriminates that a period of the BD signal 207 becomes a predetermined period and thus the rotation period of the polygon mirror 204 is stable. The engine controller 205 adjusts the driving signal 220 on the basis of the BD signal 207 and thus carries out feed-back control so that the rotation of the polygon mirror 204 is stabilized at the predetermined period. Further, the registration sensor 150 sends, to the engine controller 205, a recording material detection signal 210 generated by detecting a leading end of the recording material S. On the basis of the BD signal 207 and the recording material detection signal 210, the engine controller 205 causes the image controller 212 to input the image data signal 214 to the laser controller 201, so that the engine controller 205 causes the laser controller 201 to perform an exposure operation depending on the image data signal 214.

4. PRINT SEQUENCE

Figure 6:
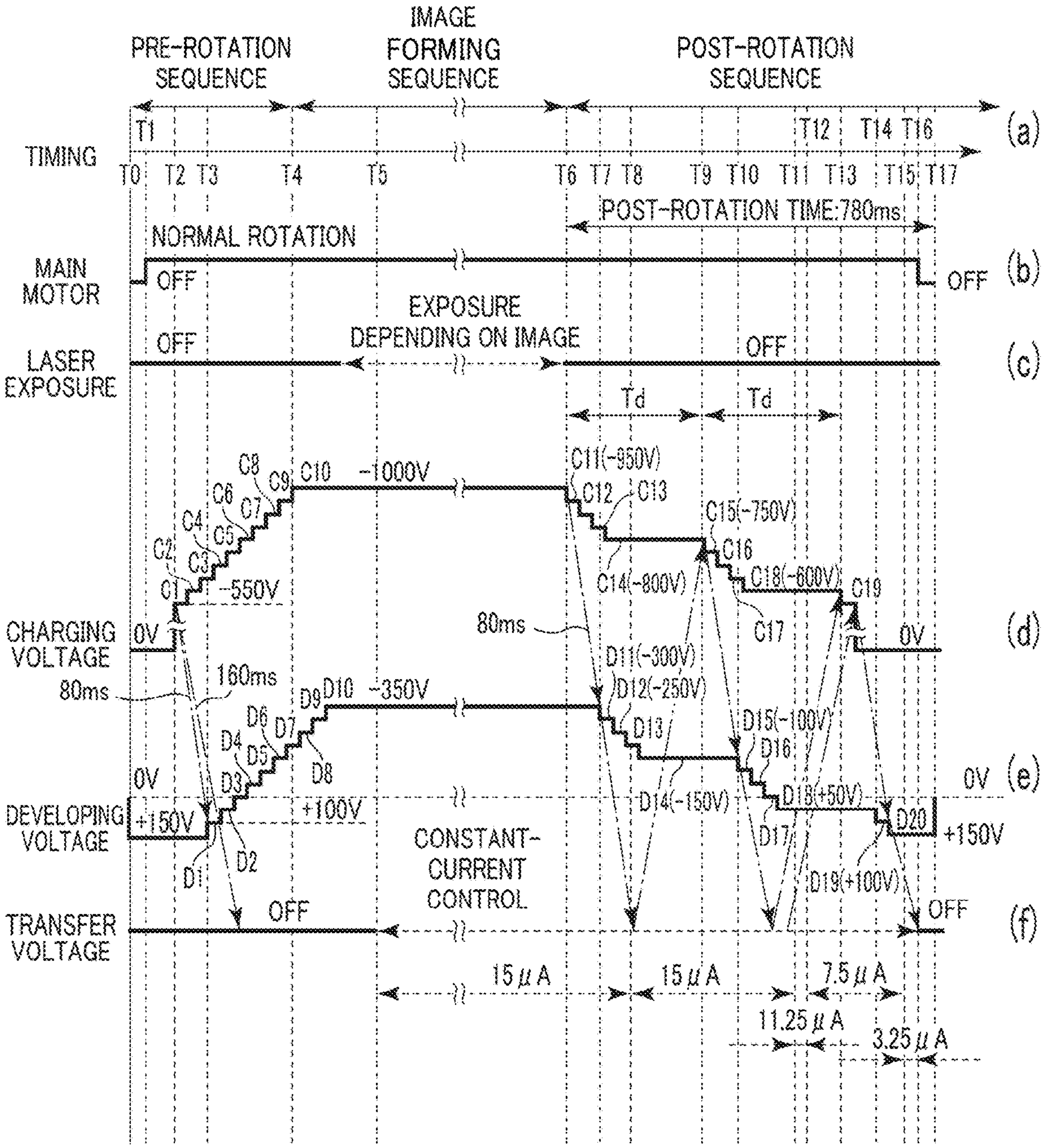
FIG. 6 is a timing chart of a print sequence of an embodiment 1.
Figure 7:
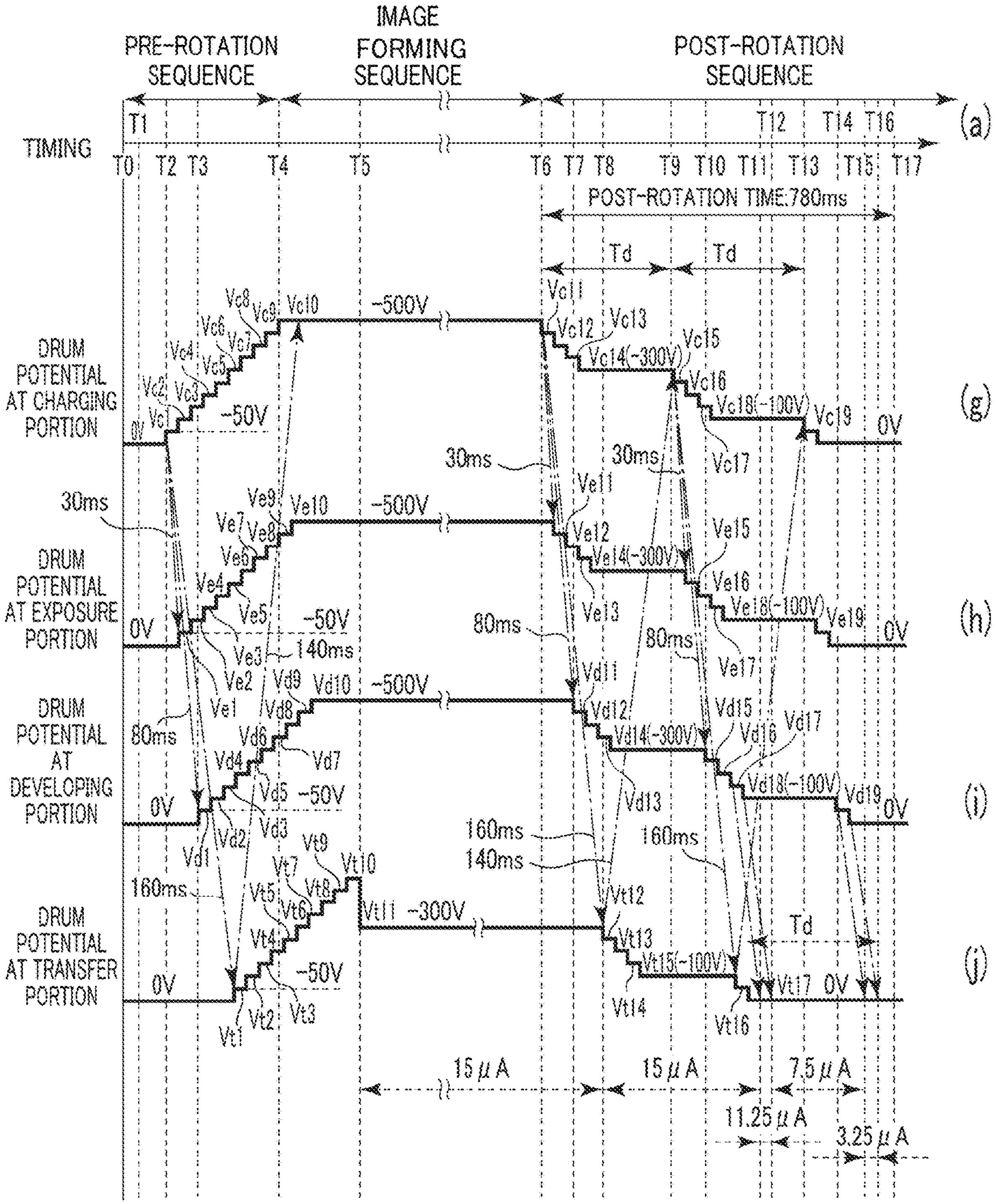
FIG. 7 is a timing chart of the print sequence of the embodiment 1.

Next, the print sequence (print operation, job) in this embodiment (embodiment 1) will be described. FIGS. 6 and 7 are timing charts each showing a print sequence in this embodiment. Operations described below in the print sequence are controlled by the engine controller 205.

Part (a) of FIG. 6 shows a timing of a starting point of various operations in the print sequence. Parts (b) and (c) of FIG. 6 show an operation timing of the main motor 10 and an operation timing of laser exposure by the exposure device 3 in the print sequence, respectively. Parts (d), (e), and (f) of FIG. 6 show outputs of the charging power source 11, the developing power source 50, and the transfer power source 14 in the print sequence, respectively. Further, parts (g), (h), (i), and (j) of FIG. 7 show surface potentials of the photosensitive drum 1 at the charging portion P, the exposure portion (laser exposure portion) L, the developing portion D, and the transfer portion T in the print sequence, respectively. The surface potentials of the photosensitive drum 1 in the charging portion P, the exposure portion L, the developing portion D, and the transfer portion T are also referred to as a "charging portion surface potential", an "exposure portion surface potential", a "developing portion surface potential", and a "transfer portion surface potential", respectively. Part (a) of FIG. 7 shows a timing which is the same as the timing which is the starting point of the respective operations in the print sequence shown in part (a) of FIG. 6, for convenience.

Incidentally, in this embodiment, each of the charging voltage and the developing voltage is subjected to constant-voltage control, and parts (d) and (e) of FIG. 6 show target voltages of the charging voltage and the developing voltage, respectively. Further, in this embodiment, the transfer voltage is subjected to constant-current control, and part (f) of FIG. 6 shows a target current of the transfer voltage. Incidentally, the constant-voltage control is control such that output of the power source is adjusted so that a voltage applied to an application object becomes substantially constant at the target voltage. Further, the constant-current control is control such that output of the power source is adjusted so that a current supplied to a supply object becomes substantially constant at the target current.

The print sequence consists of three sequences of a "pre-rotation sequence (pre-rotation operation)", an "image forming sequence (image forming operation)", and a "post-rotation sequence (post-rotation operation)". The pre-rotation sequence is performed in a period from a timing T0 to a timing T4 in each of part (a) of FIG. 6 and part (a) of FIG. 7, and is a sequence such that the surface potential of the photosensitive drum 1 is raised (increased) stepwise from 0 V to the dark-portion potential Vd (−500 V) which is the surface potential of the non-image portion for image formation. The image forming sequence is performed in a period from the timing T4 to a timing T6 in each of part (a) of FIG. 6 and part (a) of FIG. 7, and is a sequence such that the surface potential of the photosensitive drum 1 is raised to the dark-portion potential Vd (−500 V) and then is dropped to the light-portion potential Vl (−200 V) which is the surface potential of the image portion for the image formation by performing the laser exposure corresponding to the image signal. The post-rotation sequence is performed in a period from the timing T6 to a timing T17 in each of part (a) of FIG. 6 and part (a) of FIG. 7, and is a sequence such that the surface potential of the photosensitive drum 1 after the image forming sequence is lowered stepwise from the dark-portion potential Vd to 0 V. The above-described timing T0 is a timing when the print start signal is inputted to the engine controller 205, and the above-described timing T17 is a timing when the drive of the main motor 10 (photosensitive drum 1) is stopped. Further, the above-described timing T4 is a timing when the surface potential of the photosensitive drum 1 is substantially raised to the dark-portion potential Vd in the image forming sequence. This timing T4 can be represented by a timing when the target voltage of the charging voltage is a target voltage in the image forming sequence. Further, the above-described timing T6 is a timing when the surface potential of the photosensitive drum 1 is dropped from the dark-portion potential Vd in the image forming sequence by one stage as described later. This timing T6 can be represented by a timing when the target voltage of the charging voltage is dropped from the target voltage in the image forming sequence by one stage as described later. The above-described timing T6 may only be required to be a time or later when a trailing end of an image forming region on the photosensitive drum 1 for a final image in the image forming sequence passes through the charging portion P. In general, the above-described timing T6 is a timing after a predetermined time from a time when the trailing end of the image forming region for the final image passes through the charging portion P, by providing a margin. Further, the image forming sequence may include a sheet interval period corresponding to a period between a recording material S and a subsequent recording material S in a print sequence in which images are continuously formed on a plurality of recording materials S.

Incidentally, in this embodiment, the print sequence will be described by taking, as an example, the case where the print start signal is inputted when the image forming apparatus 100 is in a stand-by state (waiting state) in which the image forming apparatus 100 waits for the print start signal after a power source is turned on (main switch: ON). A time when the power source of the image forming apparatus 100 is turned on refers to, for example, a time when in a state in which a door switch for detecting opening and closing of a door for permitting mounting and dismounting of the process cartridge 17 is turned on (ON) (door: close), a state of a main power source switch is changed form an OFF state to an ON state. Or, in a state in which the main power source switch is in the ON state, the state of the door switch is changed from an OFF state (door: open) to the ON state (door: close).

When the power source of the image forming apparatus 100 is turned on (power source: ON), separately, a pre-multi-rotation sequence (pre-multi-rotation operation) which is an operation during start-up may be executed. In the pre-multi-rotation sequence, for example, control for determining appropriate setting of the charging voltage, the developing voltage, and the transfer voltage, or the like is executed in conformity to the state of the process cartridge 17. When a predetermined pre-multi-rotation sequence is ended, outputs of the main motor 10 and the various power sources are stopped, and the image forming apparatus 100 is maintained in the stand-by state until the print start signal is inputted. In the pre-multi-rotation sequence, in the case where the charging voltage and the developing voltage are raised, control similar to control in the pre-rotation sequence described later in this embodiment can be carried out.

4-1. Pre-Rotation Sequence

First, the pre-rotation sequence will be described. When the engine controller 205 receives the print start signal from the external device 300, the engine controller 205 starts the pre-rotation sequence. When the pre-rotation sequence is started, first, as shown in part (e) of FIG. 6, the developing power source 50 starts application of a developing voltage of +150 V as a developing voltage of the positive polarity which is an opposite polarity to the normal polarity of the toner from a start timing T0 of the pre-rotation sequence. The output of the developing power source 50 will be further described later.

Main Motor

As shown in part (b) of FIG. 6, at the timing T1 when rising of the developing voltage of the positive polarity is ended, the main motor 10 is actuated, so that rotation of the photosensitive drum 1 is started.

Charging Power Source

As shown in part (d) of FIG. 6, the charging power source 11 starts application of a first charging voltage (C1=−550 V) from the timing T2 when rising of the main motor 10 is ended. In this embodiment, a discharge (voltage) threshold in the charging portion P is 500 V.

Subsequent to the application of the first charging voltage (C1=−550 V), the charging power source 11 increases the charging voltage stepwise from a second charging voltage (C2=−600 V) to a tenth charging voltage (C10=−1000 V) with a voltage fluctuation width (range) of 50 V for 30 ms.

Developing Power Source

As described above, when the pre-rotation sequence is started, as shown in part (e) of FIG. 6, the developing power source 50 starts the application of the developing voltage of +150 V as the developing voltage of the positive polarity which is the opposite polarity to the normal polarity of the toner from the start timing T0 of the pre-rotation sequence. Thereafter, as shown in part (e) of FIG. 6, in the developing portion D, the developing power source 50 changes (increases) the developing voltage stepwise toward the developing voltage Vdc in the image forming sequence in synchronism with stepwise increase (rise) of the charging voltage.

In this embodiment, as shown in FIG. 8, with respect to the rotational direction of the photosensitive drum 1, a distance between the charging portion P and the developing portion D via the surface of the photosensitive drum 1 is 20 mm. Further, a time required until the surface of the photosensitive drum 1 reaches the developing portion D from the charging portion P is 80 ms (process speed: 250 mm/s). For that reason, a timing T3 when the stepwise increase of the developing voltage is started is a timing when the timing T2 of the start of the stepwise increases of the charging voltage is shifted by 80 ms.

That is, the developing power source 50 starts application of a first developing voltage (D1=+100 V) from the above-described timing T3. Further, subsequent to the application of the first developing voltage (D1), the developing power source 50 increases the developing voltage stepwise from a second developing voltage (D2=+50 V) to a tenth developing voltage (D10=−350 V) with a voltage fluctuation width of 50 V per 30 ms. The first and second developing voltages D1 and D2 are developing voltages of the positive polarity which is the opposite polarity to the normal polarity of the toner, a third developing voltage D3 is 0 V, and fourth to tenth developing voltages D4 to D10 are developing voltages of the negative polarity which is the same polarity as the normal polarity of the toner.

Transfer Power Source

As shown in part (f) of FIG. 6, in the pre-rotation sequence, the transfer power source 14 does not apply the transfer voltage.

Laser Exposure

As shown in part (c) of FIG. 6, in the pre-rotation sequence, the exposure device 3 does not perform the laser exposure.

Charging Portion Surface Potential

Next, the surface potential (charging surface potential) of the photosensitive drum 1 in the charging portion P will be described. As shown in part (g) of FIG. 7, the charging portion surface potential is kept at 0 V from the start timing T0 of the pre-rotation sequence to the timing T2 when the application of the charging voltage is started. When the stepwise increase of the charging voltage is started from the timing T2 and the charging voltage is applied, the charging portion surface potential changes (increases) stepwise from a first developing portion surface potential (Vc1=−50 V) to a tenth charging portion potential (Vc10=−500 V) with a voltage fluctuation width of 50 V per 30 ms.

That is, when the charging voltage is increased stepwise, irrespective of a charging voltage value, the charging portion surface potential is changed (increased) so that a potential difference of 500 V which is the discharge (voltage) threshold is always maintained between the charging portion surface potential and the charging voltage.

Exposure Portion Surface Potential

Next, the surface potential (exposure surface potential) of the photosensitive drum 1 in the exposure portion L will be described. As described above, in the pre-rotation sequence, the exposure device 3 does not perform the laser exposure. Further, as shown in FIG. 8, with respect to the rotational direction of the photosensitive drum 1, a distance between the charging portion P and the exposure portion L via the surface of the photosensitive drum 1 is 7.5 mm. Further, a time required that the surface of the photosensitive drum 1 reaches the exposure portion L from the charging portion P is 30 ms (process speed: 250 mm/s). For that reason, as shown in part (h) of FIG. 7, exposure portion surface potentials (Ve1 to Ve10) are substantially equal to potentials obtained by simply shifting the associated charging portion potentials by 30 ms, respectively.

Developing Portion Surface Potential

Next, the surface potential (developing portion surface potential) of the photosensitive drum 1 in the developing portion D will be described. In the developing portion D, a current does not flow through the photosensitive drum 1. Further, as shown in FIG. 8, with respect to the rotational direction of the photosensitive drum 1, a distance between the charging portion P and the developing portion D via the surface of the photosensitive drum 1 is 20 mm. Further, a time required that the surface of the photosensitive drum 1 reaches the developing portion D from the charging portion P is 80 ms (process speed: 250 mm/s). For that reason, as shown in part (i) of FIG. 7, developing portion surface potentials (Vd1 to Vd10) are substantially equal to potentials obtained by simply shifting the associated charging portion potentials by 80 ms, respectively.

Transfer Portion Surface Potential

Next, the surface potential (transfer surface potential) of the photosensitive drum 1 in the exposure portion L will be described. As described above, in the pre-rotation sequence, the transfer power source 14 does not apply the transfer voltage, and therefore, in the transfer portion T, a current does not flow through the photosensitive drum 1. Further, as shown in FIG. 8, with respect to the rotational direction of the photosensitive drum 1, a distance between the charging portion P and the transfer portion T via the surface of the photosensitive drum 1 is 40 mm. Further, a time required that the surface of the photosensitive drum 1 reaches the transfer portion T from the charging portion P is 160 ms (process speed: 250 mm/s). For that reason, as shown in part (j) of FIG. 7, transfer portion surface potentials (Vt1 to Vt10) are substantially equal to potentials obtained by simply shifting the associated charging portion potentials by 160 ms, respectively.

Effect of Control of Pre-Rotation Sequence

As described above, in this embodiment, in the pre-rotation sequence, from the state in which the surface potential of the photosensitive drum 1 is 0 V, the voltage of the opposite polarity to the normal polarity of the toner is applied to the developing roller 42, so that rotation of the photosensitive drum 1 is started. Then, on the basis of a position on the photosensitive drum 1, the charging voltage and the developing voltage are changed (increased) stepwise toward the voltages in the image forming sequence, respectively, while being synchronized with each other. Here, in this embodiment, in the pre-rotation, the laser exposure by the exposure device 3 is not performed.

Thus, by controlling the surface potential of the photosensitive drum 1 in the pre-rotation sequence, in the developing portion D, Vback can be kept at 150 V. For that reason, in the constitution in which the contact development type method is employed and in which the development contact and separation mechanism is not provided, it is possible to suppress the fog such that the toner on the developing roller 42 is transferred onto the photosensitive drum 1.

Incidentally, in this embodiment, when the charging voltage and the developing voltage are changed stepwise in the pre-rotation sequence, a retention time of an associated target voltage was 30 ms and a fluctuation width of the target voltage was 50 V, but the present invention is not limited thereto. The retention time and the fluctuation width of the target voltage can be appropriately set so that Vback in the developing portion D can be maintained within a predetermined range. As described above, in this embodiment, Vback may preferably fall, as within the predetermined range, within the range of +80 V with respect to Vback at which the fog toner amount is minimum, more preferably fall within the range of +50 V. Accordingly, the fluctuation width of the above-described target voltage may preferably be made 80 V or less, more preferably be made 50 V or less, so that even when there is a difference in rising characteristic between the charging power source 11 and the developing power source 50, Vback can be prevented from being out of the predetermined range. Further, the above-described retention time is a sufficient time when the voltages actually applied to the charging roller 2 and the developing roller 42 reach target voltages after the change and can be appropriately set so as not to become excessively long as an entire stepwise rising (increase) time. The stepwise rising time may preferably be 1 s or less, more preferably by 500 ms or less. In this embodiment, in the pre-rotation sequence, as regards each of the charging voltage and the developing voltage, by changing the target voltage with the voltage fluctuation width of 50 V per 30 ms, the voltage actually applied to the charging roller 2 and the developing roller 42 can be caused to sufficiently reach the associated target voltage.

4-2. Image Forming Sequence

Next, the image forming sequence will be described.

Main Motor

As shown in part (b) of FIG. 6, in the image forming sequence, the main motor 10 continues steady-state rotation.

Laser Exposure

As shown in part (c) of FIG. 6, in the image forming sequence, the exposure device 3 carries out control of ON and OFF of the laser light source 200 in accordance with the image data signal 214 sent from the image controller 212.

Charging Power Source

As shown in part (d) of FIG. 6, in the image forming sequence, the charging power source 11 continues the application of the tenth charging voltage (C10=−1000 V).

Developing Power Source

As shown in part (e) of FIG. 6, in the image forming sequence, the developing power source 50 continues the application of the tenth developing voltage (D10=−350 V).

Transfer Power Source

As shown in part (f) of FIG. 6, in the image forming sequence, the transfer power source 14 starts constant-current control of the transfer voltage with a target current of 15 μA from the timing T5 immediately before a leading end of an image forming region on the photosensitive drum 1 for an image on a first sheet in the image forming sequence reaches the transfer portion T.

Charging Portion Surface Potential

Next, the surface potential (charging portion surface potential) of the photosensitive drum 1 in the charging portion P will be described. As shown in part (g) of FIG. 7, the charging portion surface potential becomes the tenth charging portion surface potential (Vc10=−500 V).

Exposure Portion Surface Potential

Next, the surface potential (exposure portion surface potential) of the photosensitive drum 1 in the exposure portion L will be described. As shown in part (h) of FIG. 7, the exposure portion surface potential in the non-image portion is kept at the tenth exposure portion surface potential (Ve10 (=Vc10)=−500 V) because the laser exposure is not performed. On the other hand, the exposure portion surface potential in the image portion becomes a light-portion potential (V1=−200 V) by being subjected to the laser exposure at 0.2 $\mu J/cm^2$ which is an exposure amount of the exposure device 3 in the image forming sequence (not shown).

Developing Portion Surface Potential

Next, the surface potential (developing portion surface potential) of the photosensitive drum 1 in the developing portion D will be described. As shown in part (i) of FIG. 7, the developing portion surface potential is substantially equal to a potential obtained by simply shifting the exposure portion surface potential by 50 ms (=80 ms−30 ms: FIG. 8). That is, the developing portion surface potential becomes the tenth developing portion potential (Vd10 (=Vc10)=−500 V) in the non-image portion and becomes the light-portion potential (V1=−200 V) in the image portion.

Thus, by controlling the surface potential of the photosensitive drum 1, in the non-image portion, Vback is kept at 150 V in the developing portion D, and therefore, the development is not made. On the other hand, in the image portion, in the developing portion D, the surface potential of the photosensitive drum 1 is lower than the developing voltage by 150 V, and therefore, the toner is transferred from the developing roller 42 onto the photosensitive drum 1, so that the development is made.

Transfer Portion Surface Potential

Figure 9:
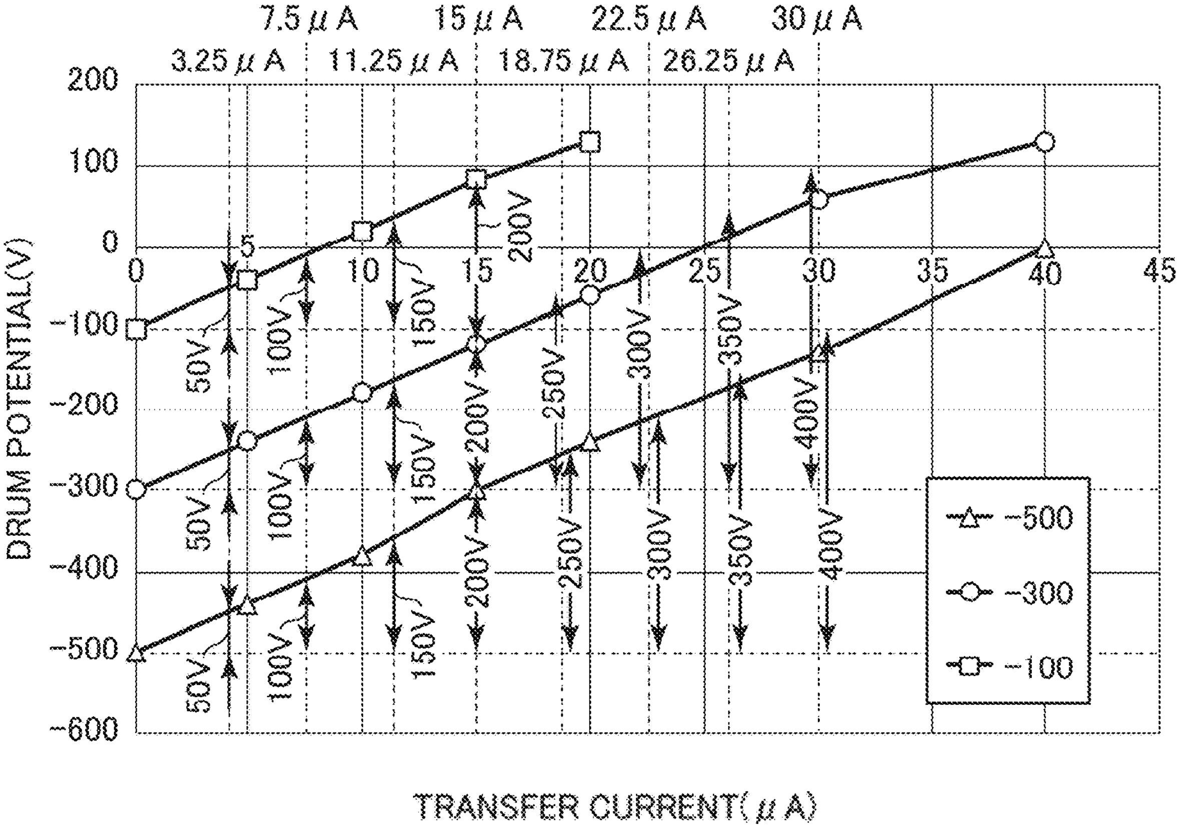
FIG. 9 is a graph showing a relationship between a transfer current and a surface potential of the photosensitive drum.

Next, the surface potential (transfer portion surface potential) of the photosensitive drum 1 in the transfer portion T will be described. FIG. 9 is a graph showing a relationship between a transfer current flowing through the photosensitive drum 1 in the transfer portion T and the surface potential (transfer portion surface potential) of the photosensitive drum 1 in the transfer portion T. In FIG. 9, the abscissa represents the transfer current, and the ordinate represents the transfer portion surface potential (drum potential). Further, FIG. 9 shows the above-described relationship in each of the cases where the surface potential of the photosensitive drum before the photosensitive drum surface enters the transfer portion (at a portion downstream of the developing portion D and upstream of the transfer portion T with respect to the rotational direction of the photosensitive drum 1) is −100 V, −300 V, and −500 V. Incidentally, as regards the transfer power source 14 provided in the image forming apparatus 100 of this embodiment, there is a hardware restriction such that a transfer current of 30 μA or more cannot be outputted, and therefore, measurement was made using an external transfer power source 14 with no hardware restriction.

As shown in FIG. 9, when attention is paid to, for example, the relationship in the case where the surface potential of the photosensitive drum 1 before the photosensitive drum surface enters the transfer portion T, with an increasing transfer current, the transfer portion surface potential drops gradually, so that the transfer portion surface potential becomes 0 V in the case where the transfer current is 40 μA. When the transfer current is further increased, the polarity of the transfer portion surface potential becomes the positive polarity which is the opposite polarity to the original charge polarity of the photosensitive drum 1 in this embodiment. When the surface of the photosensitive drum 1 is charged to the positive polarity in the transfer portion T, thereafter, it becomes difficult to charge the photosensitive drum surface to the predetermined dark-portion potential Vd in the charging portion P, or the like, whereby a risk of an occurrence of an image defect increases. For that reason, it is not desired that a transfer current such that the polarity of the transfer portion surface potential becomes the positive polarity is caused to flow.

In FIG. 9, Δ plot shows a relationship between the transfer current and the transfer portion surface potential in the case where the surface potential of the photosensitive drum 1 before entering the transfer portion T is −500 V (dark-portion potential Vd (=Vd10) in the image forming sequence in this embodiment). In FIG. 9, ○ plot shows a relationship between the transfer current and the transfer portion surface potential in the case where the surface potential of the photosensitive drum 1 before entering the transfer portion T is −300 V (=fourteenth charging portion surface potential Vc14 (described later)). In FIG. 9, □ plot shows a relationship between the transfer current and the transfer portion surface potential in the case where the surface potential of the photosensitive drum 1 before entering the transfer portion T is −100 V (eighteenth charging portion surface potential Vc18 (described later)).

As shown in FIG. 9, in either of the cases where the surface potential of the photosensitive drum 1 before entering the transfer portion T is −100 V, −300 V, and −500 V, it is understood that the transfer current and a width of the surface potential of the photosensitive drum 1 lowered by the transfer current are substantially in a proportional relationship. That is, irrespective of the surface potential of the photosensitive drum 1 before entering the transfer portion T, in the case where the transfer current is 15 μA, the surface potential of the photosensitive drum 1 drops by 200 V. Further, in the case where the transfer current is 11.25 μA, the surface potential of the photosensitive drum 1 drops by 150 V. Further, in the case where the transfer current is 7.5 μA, the surface potential of the photosensitive drum 1 drops by 100 V. Further, in the case where the transfer current is 3.25 μA, the surface potential of the photosensitive drum 1 drops by 50 V.

As shown in part (j) of FIG. 7, the surface potential of the photosensitive drum 1 before entering the transfer portion T in the non-image portion is −500 V (=Vt10), and therefore, by receiving a transfer current (Ia=15 μA) in the image forming sequence, the transfer portion surface potential becomes an eleventh transfer portion surface potential (Vt11=−300 V). On the other hand, the surface potential of the photosensitive drum 1 before entering the transfer portion T in the image portion is −200 V (=V1), and therefore, by receiving the transfer current (Ia=15 μA) in the image forming sequence, the transfer portion surface potential becomes 0 V (not shown).

4-3. Post-Rotation Sequence

Next, a post-rotation sequence will be described.

Main Motor

As shown in part (b) of FIG. 6, the main motor 10 steadily rotates to a timing T16. Then, from the timing T16, the main motor 10 starts a stopping operation, and the rotation of the main motor 10 (photosensitive drum 1) completely stops until a timing T17. The above-described timing T16 is, as described later, a timing when and after the developing portion surface potential is made 0 V.

Laser Exposure

As shown in part (c) of FIG. 6, in the post-rotation sequence, the exposure device 3 does not perform the laser exposure.

Charging Power Source

As shown in part (d) of FIG. 6, from an end timing T6 of the image forming sequence, the charging power source 11 lowers (decreases) the charging voltage stepwise from an eleventh charging voltage (C11=−950 V) to a fourteenth charging voltage (C14=−800 V) with the voltage fluctuation width of 50 V per 30 ms. Application of the fourteenth charging voltage (C14=−800 V) is continued to a timing T9. This region T9 is a timing after a lapse of a time (Td=300 ms), from the timing T6 as a starting point, required for one-full circumference (75 mm) of the photosensitive drum 1. Then, from the timing T9, the charging power source 11 lowers the charging voltage stepwise from a fifteenth charging voltage (C15=−75 V) to an eighteenth charging voltage (C18=−600 V) with a voltage fluctuation width of 50 V for 30 ms. Application of the eighteenth charging voltage (C18=−600 V) is continued to a timing T13. This timing T13 is a timing after elapse of the time (Td=300 ms), from the timing T9 as a starting point, required for one-full circumference (75 mm) of the photosensitive drum 1. Then, the charging power source 11 lowers the charging voltage to a nineteenth charging voltage (C19=−550 V) and then terms off the charging voltage after a lapse of 30 ms.

Incidentally, the reason why application of the fourteenth charging voltage (C14=−800 V) and the eighteenth charging voltage (C18=−600 V) will be described later.

Developing Power Source

As shown in part (e) of FIG. 6, in the developing portion D, the developing power source 50 changes (lowers) the developing voltage stepwise in synchronism with stepwise lowering (falling) of the charging voltage.

In this embodiment, as described above, a time required until the surface of the photosensitive drum 1 reaches the developing portion D from the charging portion P is 80 ms. For that reason, a timing T7 when the stepwise lowering of the developing voltage is started is a timing when the timing T6 of the start of the stepwise lowering of the charging voltage is shifted by 80 ms.

That is, the developing power source 50 changes (lowers) the developing voltage stepwise from an eleventh developing voltage (D11=−300 V) to a fourteenth developing voltage (D14=−150 V) with a voltage fluctuation width of 50 V per 30 ms from the above-described timing T7 when a stepwise lowering of the developing voltage is started. Application of the fourteenth developing voltage (D14=−150 V) is continued to a timing T10. This timing 10 is a timing after a lapse of a time (Td=300 ms), from the timing T7 as a starting point, required for one-full circumference (75 mm) of the photosensitive drum 1. Further, from the timing T10, the developing power source 50 changes (lowers) the developing voltage stepwise from a fifteenth developing voltage (D15=−100 V) to an eighteenth developing voltage (D18=+50 V) with a voltage fluctuation width of 50 V per 30 ms. Application of the eighteenth developing voltage (D18=+50 V) is continued to a timing T14. This timing T14 is a timing after a lapse of the time (Td=300 ms), from a timing T10 as a starting point, required for one-full circumference (75 mm) of the photosensitive drum 1. Then, the developing power source 50 changes (lowers) the developing voltage to a nineteenth developing voltage (D19=+100 V) at the timing T14, and then changes (lowers) the developing voltage to a twentieth developing voltage (D20=+150 V) after a lapse of 30 ms. Thereafter, the developing power source 50 continues application of the twentieth developing voltage (D20=+150 V) until an end timing T17 of the post-rotation sequence, and then turns off the developing voltage. Eleventh to sixteenth developing voltages D11 to D16 are developing voltages of the negative polarity which is the same polarity as the normal polarity of the toner, a seventeenth developing voltage D17 is 0 V, and eighteenth to twentieth developing voltages D18 to D20 are developing voltages of the positive polarity which is the opposite polarity to the normal polarity of the toner.

Transfer Power Source

As shown in part (f) of FIG. 6, the transfer power source 14 carries out constant-current control of the transfer voltage, from the timing T8 to the region T11, at which a target current is 15 μA which is the target current in the image forming sequence. The above-described timing T8 is a timing when the timing T6 of starting the stepwise lowering of the charging voltage is shifted by 160 ms which is a time required that the surface of the photosensitive drum 1 reaches the transfer portion T from the charging portion P. That is, the timing T8 is a timing when the surface of the photosensitive drum 1 positioned in the charging portion P at the timing T6 reaches the transfer portion T. Thereafter, the transfer power source 14 carries out the constant-current control of the transfer voltage, from the timing T11 to the timing T12, at which the target current is 11.25 μA. Then, the transfer power source 14 carries out the constant-current control of the transfer voltage, from the timing T12 to the timing T15, at which the target current is 7.5 μA. Then, the transfer power source 14 carries out the constant-current control of the transfer voltage, from the timing T15 to the timing T16, at which the target current is 3.25 A, and then turns off the transfer voltage.

Thus, by changing the transfer current stepwise, as described later, the surface potential of the photosensitive drum 1 after the end of the post-rotation sequence can be made 0 V over a full circumference of the photosensitive drum 1 without changing the polarity of the surface potential of the photosensitive drum 1 to the positive polarity.

Charging Portion Surface Potential

Next, the surface potential (charging surface potential) of the photosensitive drum 1 in the charging portion P will be described. As shown in part (g) of FIG. 7, the charging portion surface potentials (Vc11 to 0 V) in the pre-rotation sequence are changed (lowered), similarly as the charging portion surface potential in the pre-rotation sequence so that the potential difference between itself and the charging voltage is maintained at 500 V which is the discharge (voltage) threshold.

Exposure Portion Surface Potential

Next, the surface potential (exposure surface potential) of the photosensitive drum 1 in the exposure portion L will be described. As described above, in the post-rotation sequence, the exposure device 3 does not perform the laser exposure. For that reason, as shown in part (h) of FIG. 7, exposure portion surface potentials (Ve11 to 0 V) are substantially equal to potentials obtained by simply shifting the associated charging portion potentials by 30 ms, respectively, which is a time required that the surface potential of the photosensitive drum 1 reaches the exposure portion L from the charging portion P.

Developing Portion Surface Potential

Next, the surface potential (developing portion surface potential) of the photosensitive drum 1 in the developing portion D will be described. In the developing portion D, a current does not flow through the photosensitive drum 1. For that reason, as shown in part (i) of FIG. 7, developing portion surface potentials (Vd11 to 0 V) are substantially equal to potentials obtained by simply shifting the associated charging portion potentials by 80 ms, respectively, which is a time required that the surface potential of the photosensitive drum 1 reaches the developing portion D from the charging portion P.

Transfer Portion Surface Potential

Next, the surface potential (transfer surface potential) of the photosensitive drum 1 in the exposure portion L will be described. As shown in FIG. 9, the transfer portion surface potential drops by 200 V in the case where the transfer current is 15 μA. For that reason, as shown in part (j) of FIG. 7, in the case where the target current of the transfer current is 15 μA, the transfer portion surface potential becomes transfer portion surface potentials (Vt12=−250 V to Vt17=0 V) obtained by dropping the developing portion surface potentials (Vd11=−450 V to Vd16=−200 V), respectively, shown in part (i) of FIG. 7 by 200 V.

Similarly, as shown in FIG. 9, the transfer portion surface potential drops by 150 V in the case where the transfer current is 11.25 μA. For that reason, as shown in part (j) of FIG. 7, in the case where the target current of the transfer current is 11.25 μA, the transfer portion surface potential becomes the transfer portion surface potential (Vt17=0 V) obtained by dropping the developing portion surface potential (Vd17=−150 V) shown in part (i) of FIG. 7 by 150 V.

Similarly, as shown in FIG. 9, the transfer portion surface potential drops by 100 V in the case where the transfer current is 7.5 μA. For that reason, as shown in part (j) of FIG. 7, in the case where the target current of the transfer current is 7.5 μA, the transfer portion surface potential becomes the transfer portion surface potential (Vt17=0 V) obtained by dropping the developing portion surface potential (Vd18=−100 V) shown in part (i) of FIG. 7 by 100 V.

Similarly, as shown in FIG. 9, the transfer portion surface potential drops by 150 V in the case where the transfer current is 3.25 μA. For that reason, as shown in part (j) of FIG. 7, in the case where the target current of the transfer current is 3.25 μA, the transfer portion surface potential becomes the transfer portion surface potential (Vt17=0 V) obtained by dropping the developing portion surface potential (Vd19=−50 V) shown in part (i) of FIG. 7 by 50 V.

Thus, by changing the transfer current stepwise, the surface potential of the photosensitive drum 1 after the end of the post-rotation sequence can be made 0 V over a full circumference of the photosensitive drum 1 without changing the polarity of the surface potential of the photosensitive drum 1 to the positive polarity. Incidentally, the electric discharge of the surface of the photosensitive drum 1 in the transfer portion T would be considered principally by electric charge injection. Further, the discharge of the surface of the photosensitive drum 1 in the transfer portion T correlates with the transfer current as described above, and therefore, the transfer voltage may preferably be subjected to the constant-current control. However, the transfer voltage may also be subjected to the constant-voltage control so that a similar transfer current can be obtained.

Next, the reason why application of the fourteenth charging voltage (C14=−800 V) is continued to the timing T9 as shown in part (d) of FIG. 6 will be described. During the application of the fourteenth charging voltage (C14=−800 V), the surface potential of the photosensitive drum 1 reaching the charging portion P after passing through the transfer portion T is −300 V as shown in part (j) of FIG. 7. For that reason, even if the charging voltage is lowered to a voltage lower than the fourteenth charging voltage (C14=−800 V), the charging portion surface potential cannot be lowered to −300 V. This is because in the charging portion P, although the surface potential of the photosensitive drum 1 can be increased, the surface potential of the photosensitive drum 1 cannot be lowered. For that reason, after the eleventh to fourteenth charging voltages lowered stepwise are applied, arrival of the surface of the photosensitive drum 1 passed through the transfer portion T at the charging portion P is waited until the timing T9, and then the charging voltage is lowered stepwise again. Also, the reason why the application of the eighteenth charging voltage (C18=−600 V) is continued to the timing T13 is similar to the above-described reason.

Effect of Control of Post-Rotation Sequence

As described above, in this embodiment, in the post-rotation sequence, when the surface potential of the photosensitive drum 1 is dropped to 0 V, the charging voltage and the developing voltage are synchronized with each other and are changed (lowered) stepwise on the basis of associated positions of the photosensitive drum 1. Here, in this embodiment, the image forming apparatus 100 does not include the discharging device, such as a pre-exposure device, for discharge of the surface of the photosensitive drum 1 in a region from the transfer portion T to the charging portion P. Further, in this embodiment, in the post-rotation sequence, laser exposure by the exposure device 3 is not performed. Then, in this embodiment, in the post-rotation sequence, the surface of the photosensitive drum 1 is discharged by passing the transfer current through the transfer portion T. Further, in this embodiment in the post-rotation sequence, lowering of the charging voltage and the developing voltage is performed while taking the surface potential of the photosensitive drum 1 after passing through the transfer portion T into consideration. By this, in the constitution in which the contact development type method is employed and in which the development contact and separation mechanism is not provided, it becomes possible to stably increase the surface potential of the photosensitive drum 1 while maintaining Vback within the predetermined range during the post-rotation operation.

Incidentally, in this embodiment, when the charging voltage and the developing voltage are changed stepwise in the post-rotation sequence, a retention time of an associated target voltage was 30 ms and a fluctuation width of the target voltage was 50 V, but the present invention is not limited thereto. The retention time and the fluctuation width of the target voltage can be appropriately set so that Vback in the developing portion D can be maintained within a predetermined range. As described above, in this embodiment, Vback may preferably fall, as within the predetermined range, within the range of ±80 V with respect to Vback at which the fog toner amount is minimum, more preferably fall within the range of ±50 V. Accordingly, the fluctuation width of the above-described target voltage may preferably be made 80 V or less, more preferably be made 50 V or less, so that even when there is a difference in falling characteristic between the charging power source 11 and the developing power source 50, Vback can be prevented from being out of the predetermined range. Further, the above-described retention time is a sufficient time when the voltages actually applied to the charging roller 2 and the developing roller 42 reach target voltages after the change and can be appropriately set so as not to become excessively long as an entire stepwise falling (lowering) time. The stepwise falling time may preferably be 1 s or less, more preferably by 500 ms or less. In this embodiment, in the post-rotation sequence, as regards each of the charging voltage and the developing voltage, by changing the target voltage with the voltage fluctuation width of 50 V per 30 ms, the voltage actually applied to the charging roller 2 and the developing roller 42 can be caused to sufficiently reach the associated target voltage.

The above-described retention time and the above-described fluctuation width of the target voltage in the post-rotation sequence may also be different from those in the above-described pre-rotation sequence.

5. COMPARISON EXAMPLE

Figure 10:
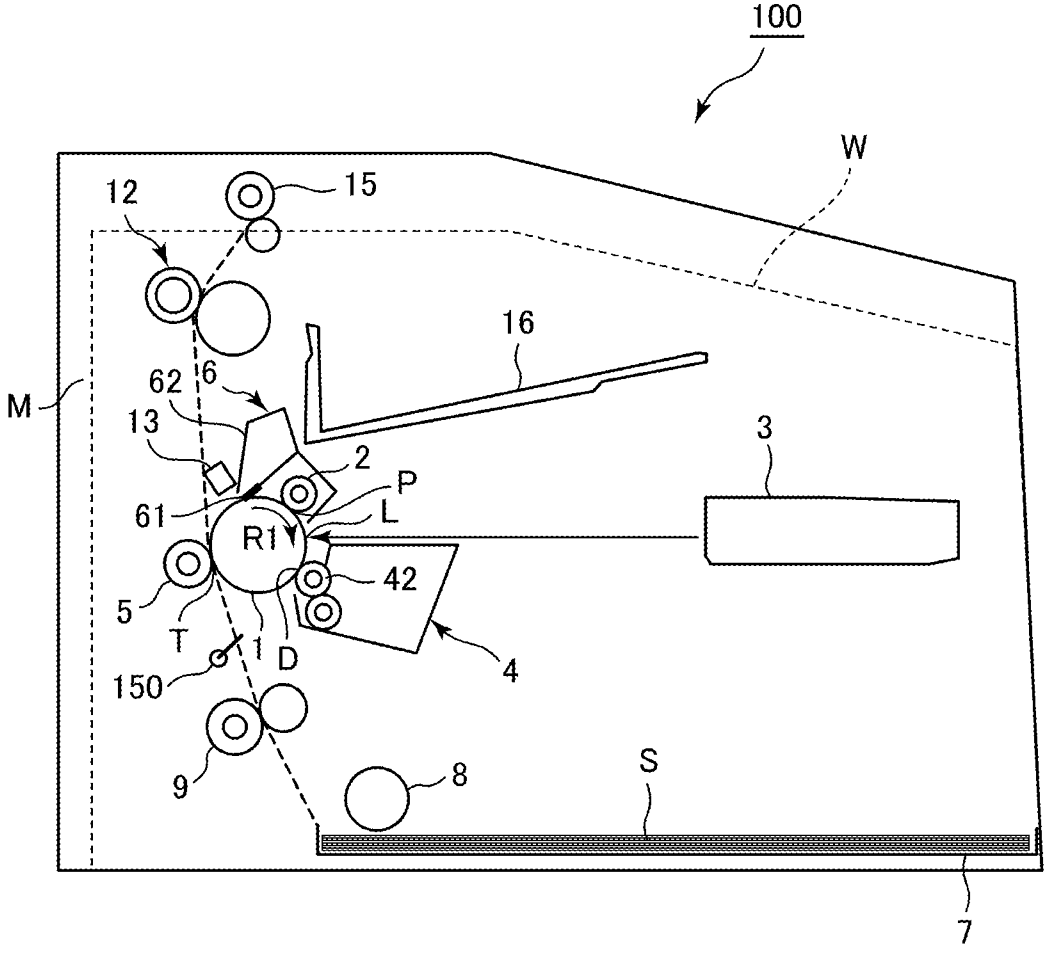
FIG. 10 is a schematic sectional view of an image forming apparatus of a comparison example.

Next, an image forming apparatus of a comparison example will be described. Incidentally, also, as regards the image forming apparatus of the comparison example, elements having the same or corresponding functions or constitutions as those in the image forming apparatus of this embodiment will be described by adding the same reference numerals or symbols as those in the image forming apparatus of this embodiment. FIG. 10 is a schematic sectional view of an image forming apparatus 100 of the comparison example. There are principally two points as a difference between the image forming apparatus 100 of the comparison example and the image forming apparatus 100 of this embodiment. One point is a mechanical constitution, and the other point is a post-rotation sequence.

First, a constitution of the image forming apparatus 100 of the comparison example will be described. As shown in FIG. 10, the image forming apparatus 100 of the comparison example is provided with a pre-exposure device 13 which is the discharging device at a periphery of the photosensitive drum 1. The pre-exposure device 13 is positioned downstream of the transfer roller 5 and upstream of the charging roller 2 with respect to the rotational direction of the photosensitive drum 1. Further, the pre-exposure device 13 irradiates, with light, a region of the surface of the photosensitive drum 1 passed through the transfer portion T. The pre-exposure device 13 irradiates, with light, an entire image forming region of the photosensitive drum 1 with respect to the rotational direction of the photosensitive drum 1. The pre-exposure device 13 is constituted by including an LED as a light source. With respect to the rotational direction of the photosensitive drum 1, a position on the photosensitive drum 1 irradiated with light by the pre-exposure device 13 is a pre-exposure position (pre-exposure portion) E. In FIG. 8, a positional relationship of the pre-exposure portion E at a periphery of the photosensitive drum 1 in the comparison example is shown.

Figure 11:
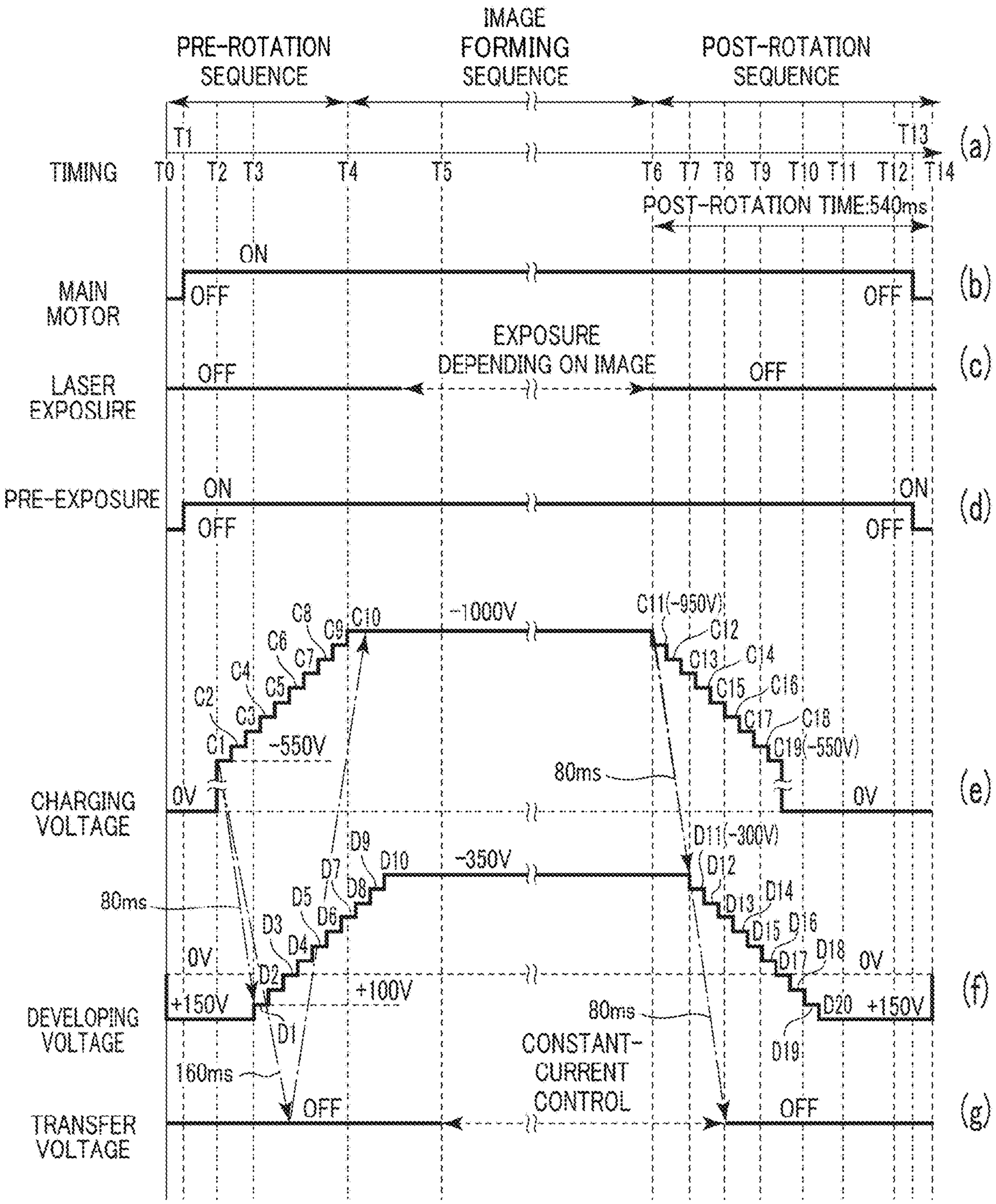
FIG. 11 is a timing chart of a print sequence in the comparison example.
Figure 12:
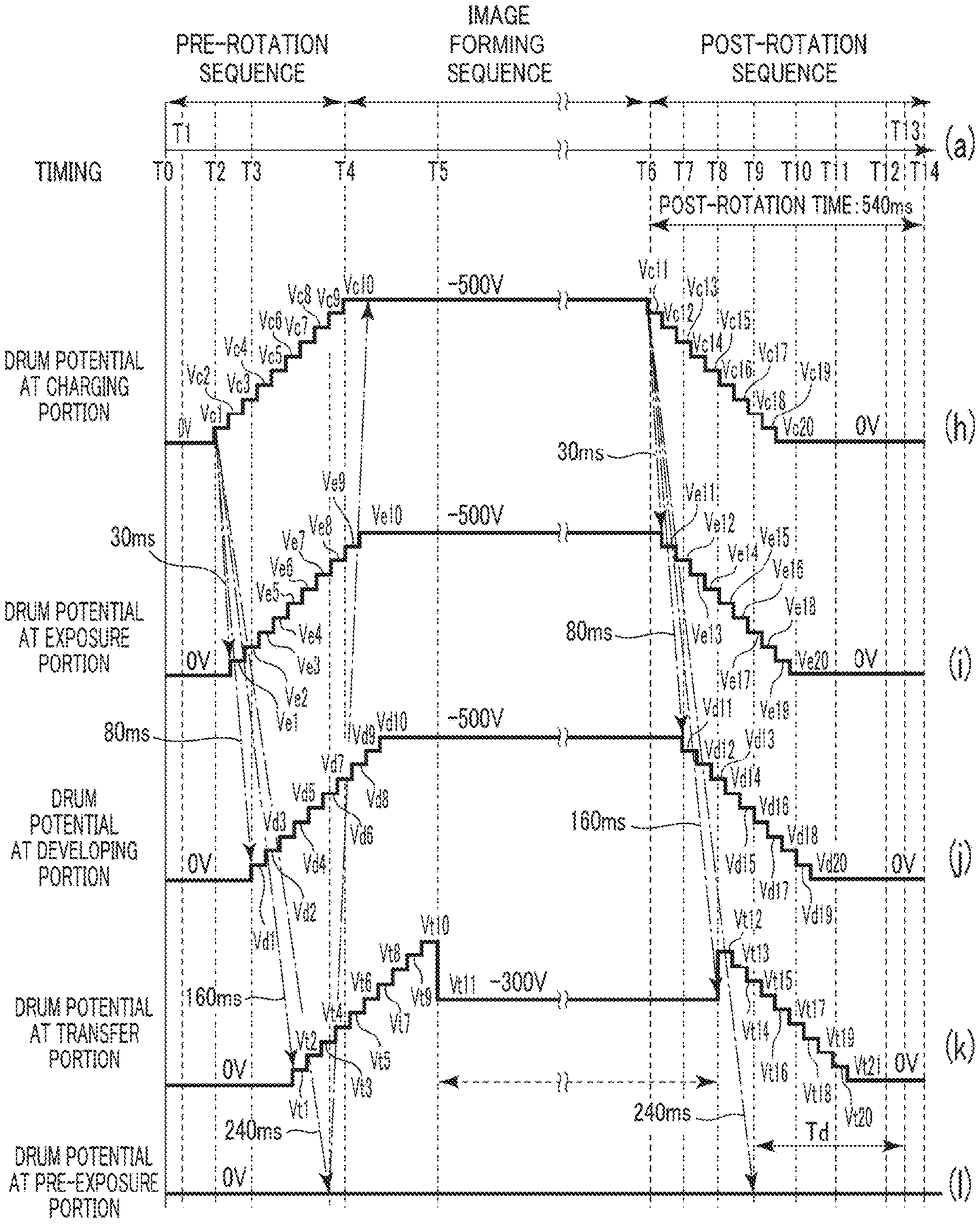
FIG. 12 is a timing chart of the print sequence in the comparison example.

Next, the post-rotation sequence in the comparison example will be described. FIGS. 11 and 12 are timing charts, corresponding to the timing charts of FIGS. 6 and 7, respectively, in this embodiment, each showing a print sequence in the comparison example. Part (a) of FIG. 11 shows a timing of a starting point of various operations in the print sequence. Parts (b), (c), and (d) of FIG. 11 show an operation timing of the main motor 10, an operation timing of laser exposure by the exposure device 3, and an operation timing of exposure by the pre-exposure device 13 in the print sequence, respectively. Parts (e), (f), and (g) of FIG. 11 show outputs (target values) of the charging power source 11, the developing power source 50, and the transfer power source 14 in the print sequence, respectively. Further, parts (h), (i), (j), (k), and (l) of FIG. 12 show surface potentials of the photosensitive drum 1 at the charging portion P, the exposure portion (laser exposure portion) L, the developing portion D, the transfer portion T, and the pre-exposure portion E in the print sequence, respectively. The surface potential of the photosensitive drum 1 in the pre-exposure portion E is also referred to as a "pre-exposure portion surface potential". Part (a) of FIG. 12 shows a timing which is the same as the timing which is the starting point of the respective operations in the print sequence shown in part (a) of FIG. 11, for convenience.

The control of the main motor 10 and the control of the laser exposure by the exposure device 3 in the comparison example are similar to those in this embodiment, and therefore, description thereof will be omitted. Further, in the comparison example, different from this embodiment, application of the transfer voltage is not made in the post-rotation sequence as shown in part (g) of FIG. 11, and the surface potential of the photosensitive drum 1 is dropped by turning on the pre-exposure device 13 in the post-rotation sequence as shown in part (d) of FIG. 11. As shown in part (d) of FIG. 11, the exposure by the pre-exposure device 13 is started from the timing T1 when the rotation of the photosensitive drum 1 in the pre-rotation sequence is started and is continued to the end timing T13 of the post-rotation sequence. Further, as shown in part (l) of FIG. 12, the surface potential of the photosensitive drum 1 at a portion exposed to the light by the pre-exposure device 13 becomes 0 V.

Charging Power Source

As shown in part (e) of FIG. 11, from a start timing T6 of the post-rotation sequence, the charging power source 11 lowers (decreases) the charging voltage stepwise from an eleventh charging voltage (C11=−950 V) to a nineteenth charging voltage (C19=−550 V) with the voltage fluctuation width of 50 V per 30 ms. The charging power source 11 applies the nineteenth charging voltage (C19=−550 V) for 30 ms, and then turns off the charging voltage.

Developing Power Source

As shown in part (f) of FIG. 11, in the developing portion D, the developing power source 50 changes (lowers) the developing voltage stepwise in synchronism with stepwise in synchronism with stepwise lowering (falling) of the charging voltage. That is, from the timing T7, the developing power source 50 changes (lowers) the developing voltage stepwise from the eleventh developing voltage (D11=−300 V) to the twentieth developing voltage (D20=+150 V) with the voltage fluctuation width of 50 V per 30 ms.

Transfer Power Source

As shown in part (g) of FIG. 11, the transfer power source 14 turns off the transfer voltage from the timing T8 when the surface of the photosensitive drum 1 positioned in the charging portion P at the timing T6 reaches the transfer portion T.

Changing Portion Surface Potential

As shown in part (h) of FIG. 12, the charging portion surface potential changes (lowers) so that a potential difference between itself and the charging voltage is kept at 500 V which is a discharge threshold.

Exposure Portion Surface Potential, Developing Portion Surface Potential, and Transfer Portion Surface Potential In the post-rotation sequence in the comparison example, the surface potential of the photosensitive drum 1 is unchanged in the exposure portion L, the developing portion D, and the transfer portion T. For that reason, as shown in parts (i), (j), and (k) of FIG. 12, each of the exposure portion surface potential, the developing portion surface potential, and the transfer portion surface potential is substantially equal to a surface potential obtained by shifting the charging portion surface potential by a time depending on a distance to the associated portion.

Comparison Result

Next, a comparison result between this embodiment and the comparison example will be described. Comparison items are a time required for the post-rotation sequence, a width of the apparatus main assembly M, a height of the apparatus main assembly M, a depth of the apparatus main assembly M, and a component (part) cost.

The time required for the post-rotation sequence is 780 ms in this embodiment, and is 540 ms in the comparison example, so that this time is longer in this embodiment than in the comparison example by 240 ms. On the other hand, although the width of the apparatus main assembly M (with respect to a perpendicular direction to a surface of a drawing sheet of FIGS. 1 and 10) is the same between this embodiment and the comparison example, the high of the apparatus main assembly M (with respect to an up-down direction in FIGS. 1 and 10) is higher in the comparison example than in this embodiment. This is because the pre-exposure device 13 is mounted in the apparatus main assembly M. Similarly, the depth of the apparatus main assembly M (left-right direction of FIGS. 1 and 10) is also larger in the comparison example than in this embodiment. Incidentally, in FIG. 10, a contour line W of the image forming apparatus 100 of this embodiment shown in FIG. 1 is shown so as to overlap with the image forming apparatus 100 of the comparison example. Further, the component cost in the comparison example becomes higher than the component cost in this embodiment by a cost for the pre-exposure device 13 (LED, substrate for mounting, driver IC, and the like).

Thus, in this embodiment, an image forming apparatus 100 includes a rotatable image bearing member 1, a charging member 2 configured to electrically charge a surface of the image bearing member 1 to a predetermined polarity at a charging position P, a developing member 42 contacting the surface of the image bearing member 1 and configured to form a toner image by supplying toner to the surface of the image bearing member 1 at a developing position D downstream of the charging position P with respect to a rotational direction of the image bearing member 1, a transfer member 5 contacting the surface of the image bearing member 1 and configured to transfer the toner image from the image bearing member 1 onto a recording material S at a transfer position T downstream of the developing position D and upstream of the charging position P with respect to the rotational direction of the image bearing member 1, a charging voltage applying portion 11 configured to apply a charging voltage of the same polarity as the predetermined polarity to the charging member 2, a developing voltage applying portion 50 configured to apply a developing voltage to the developing member 42, a transfer voltage applying portion 14 configured to apply a transfer voltage of an opposite polarity to the above-described predetermined polarity to the transfer member 5, and a controller 205 configured to control the charging voltage applying portion 11, the developing voltage applying portion 50, and the transfer voltage applying portion 14. Rotation of the image bearing member 1 is started and stopped in a state that the developing member 42 contacts the image bearing member 1 and an image forming operation which the toner image transferred onto the recording material S is formed and a post-rotation operation until the rotation of the image bearing member 1 after the image forming operation is ended is stopped are executed. Further, in this embodiment, during the post-rotation operation, the controller 205 controls the charging voltage applying portion 11 so that the charging voltage is changed stepwise to a first charging voltage smaller in absolute value than the charging voltage during the image forming operation and then to a second charging voltage smaller in absolute value than the first charging voltage, and thereafter application of the charging voltage is ended. Further, during the post-rotation operation, when regions of the surface of the image bearing member 1 passed through the charging position P under application of the first charging voltage and the second charging voltage are a first region and a second region, respectively, the controller 205 ends application of the developing voltage after changes the developing voltage to a first developing voltage when the first region first passes through the developing position D and to a second developing voltage when the second region first passes through the developing position D. The controller 205 controls the developing voltage applying portion 50 so that a potential difference between a surface potential of the first region when the first region first passes through the developing position D and the first developing voltage and a potential difference between a surface potential of the second region when the second region first passes through the developing position D and the second developing voltage are maintained within a predetermined range. Further, in this embodiment, during the post-rotation operation, the controller 205 controls the transfer voltage applying portion 14 so that a current is flowed between the transfer member 5 and the image bearing member 1 under application of the transfer voltage when each of the first region and the second region first passes through the transfer position T and so that an absolute value of a surface potential of the image bearing member 1 is made small when at least one of the first region and the second region first passes through the transfer position T. Further, in this embodiment, in a case that a potential difference between a surface potential when a region of the surface of the image bearing member 1 which becomes the first region enters the charging position P and the first charging voltage is larger than a discharge threshold and that a potential difference between a surface potential when a region of the surface of the image bearing member which becomes the second region enters the charging position P and the second charging voltage is the discharge threshold or less, the controller 205 controls the charging applying portion 11 so that a time of application of the second charging voltage is made longer than a time of application of the first charging voltage. Further, in this embodiment, the controller 205 controls the transfer voltage applying portion 14 so that a current with a value at which the image bearing member 1 is not charged to the opposite polarity to the predetermined polarity flows between the transfer member and the image bearing member 1 when each of the first region and the second region first passes through the transfer position T. Further, in this embodiment, the controller 205 is capable of controlling the developing voltage applying portion 50 so that at least one of the first developing voltage and the second developing voltage is a voltage of an opposite polarity to a normal polarity of the toner. Further, specifically, the predetermined range is a range including a potential difference between a surface potential of a non-image portion of the surface of the image bearing member 1 at the developing position during the image forming operation and the developing voltage. Further, in this embodiment, a discharging device (pre-exposure device or the like) configured to electrically discharge the image bearing member 1 on a side downstream of the transfer position T and upstream of the charging position P with respect to the rotational direction of the image bearing member 1 is not provided. Further, in this embodiment, in a state in which the charging voltage is not applied and in which a developing voltage of an opposite polarity to a normal polarity of the toner is applied, the controller 205 controls the charging voltage applying portion 11 and the developing voltage applying portion 50 so that the rotation of the image bearing member 1 is started.

Incidentally, in this embodiment, the predetermined charge polarity of the image bearing member was the negative polarity, but the present invention is not limited thereto. The predetermined charge polarity of the image bearing member may also be the positive polarity. Similarly, in this embodiment, the normal polarity of the toner was the negative polarity, but may also be the positive polarity. Various applied voltages in the case where the predetermined charge polarity of the image bearing member and the normal polarity of the toner are the positive polarity may appropriately be changed in such a manner that the polarity of the voltages is made the opposite polarity to the polarity in this embodiment in accordance with this embodiment.

As described above, according to this embodiment, in the constitution in which the contact development type method is employed and in which the developing contact and separation mechanism is not provided, it is possible to suppress the fog during the post-rotation operation while realizing size reduction and cost reduction of the apparatus main assembly M. That is, according to this embodiment, as described above, it becomes possible to stably lower the surface potential of the photosensitive drum 1 while maintaining Vback within the predetermined range during the post-rotation operation. Thus, according to this embodiment, by stably controlling the surface potential of the photosensitive drum 1 through relatively simple control, the fog during the post-rotation operation can be suppressed while realizing downsizing and cost reduction of the image forming apparatus.

Further, in this embodiment, the constitution in which the developing contact and separation mechanism is not provided was described as an example, but irrespective of the presence or the absence of the developing contact and separation mechanism, the present invention is also applicable to the case where rising and falling of various high-voltage power sources are carried out in a state in which the photosensitive drum 1 and the developing roller 42 are rotated in contact with each other.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

According to the above-described embodiment 1, by stably controlling the surface potential of the photosensitive drum through the relatively simple control, the fog during the post-rotation operation can be suppressed while realizing the downsizing and the cost reduction of the image forming apparatus. However, in the embodiment 1, although to a practically allowable degree, a time required for the post-rotation sequence becomes longer than the time required for the post-rotation sequence in the above-described comparison example. This embodiment improves this point and is different from the embodiment 1 in control of the transfer current in the post-rotation sequence.

Figure 13:
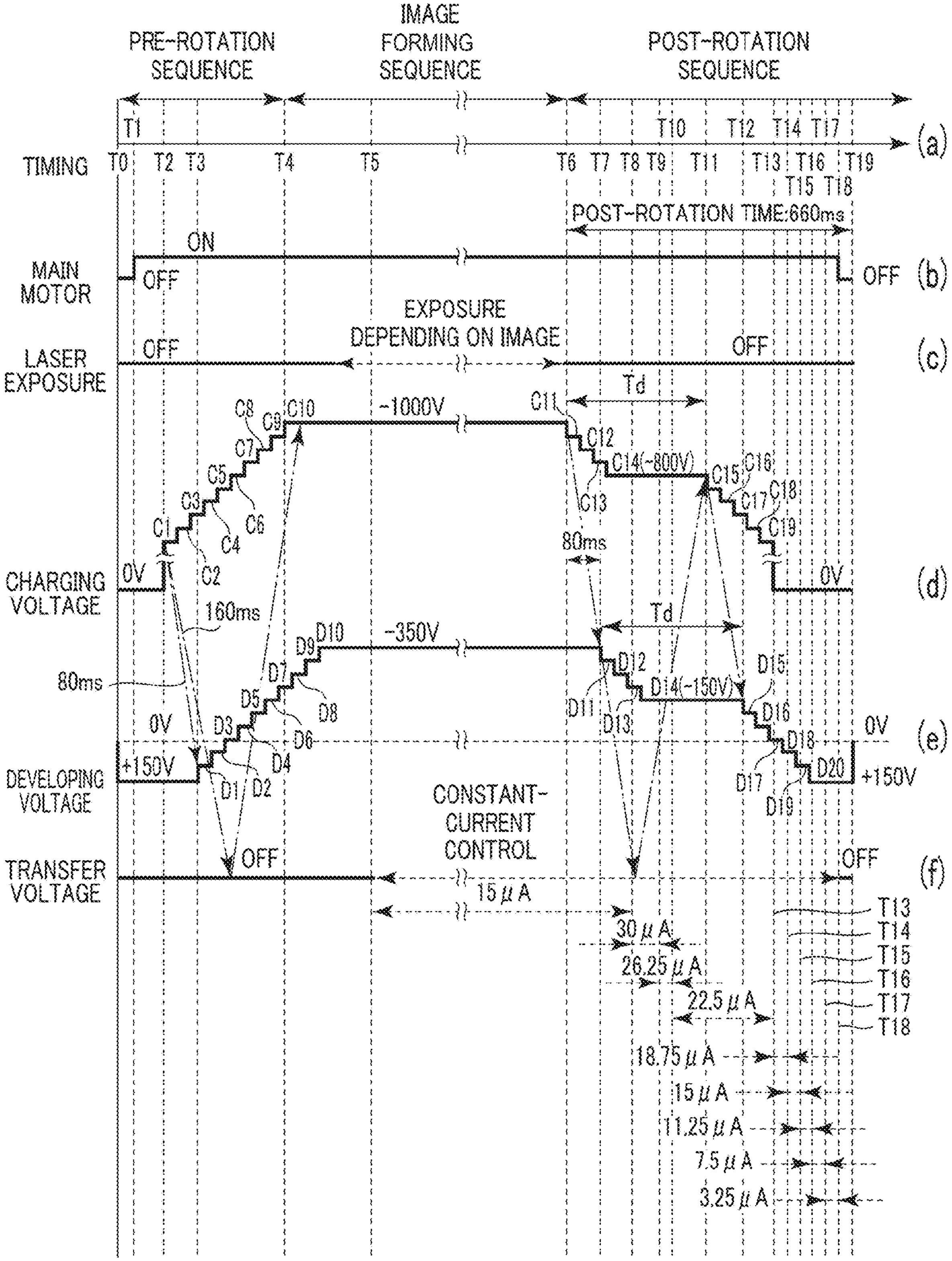
FIG. 13 is a timing chart of a print sequence in an embodiment 2.
Figure 14:
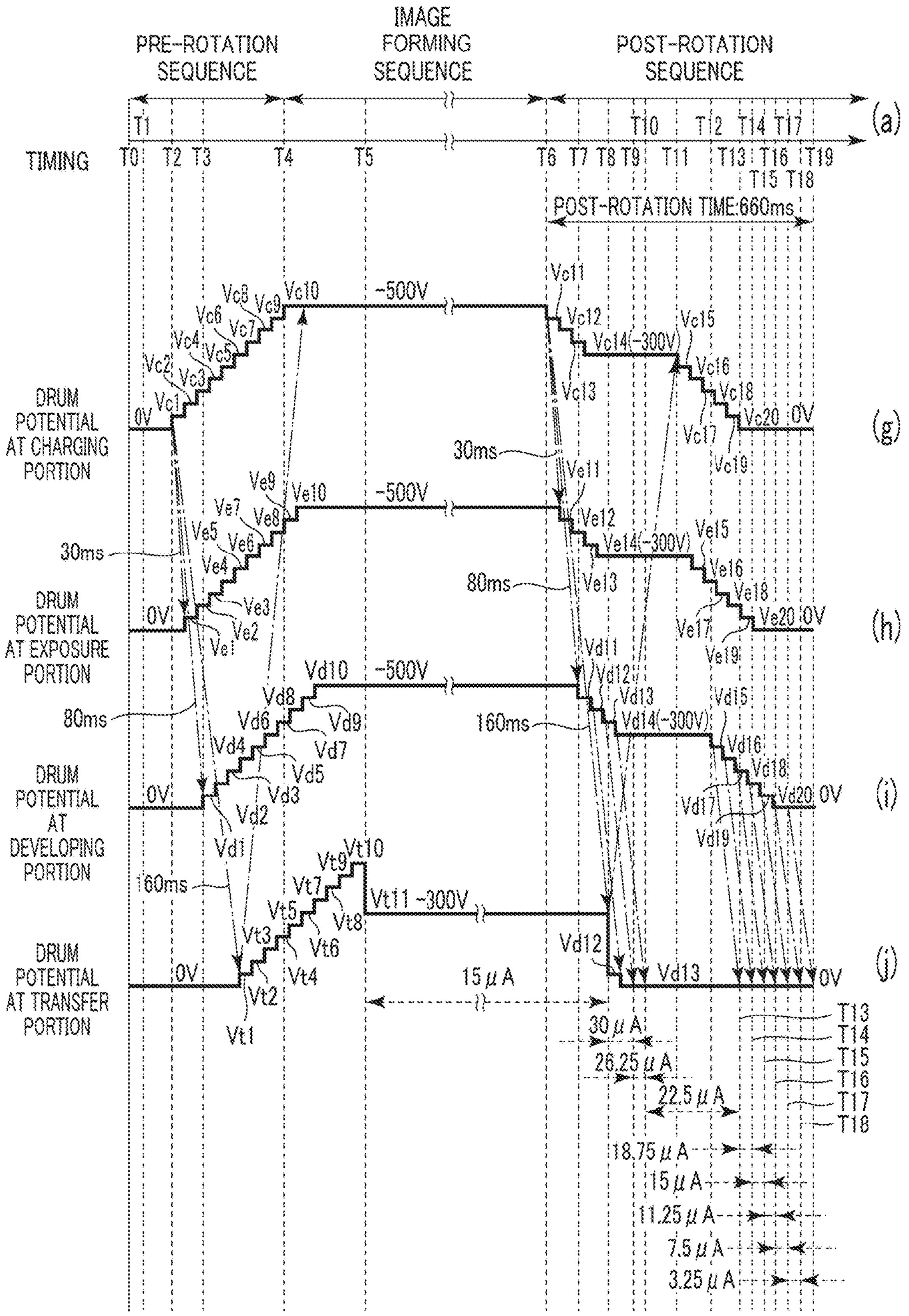
FIG. 14 is a timing chart of the print sequence in the embodiment 2.

The post-rotation sequence in this embodiment will be described. FIGS. 13 and 14 are timing charts of a print sequence in this embodiment, which correspond to FIGS. 6 and 7, respectively, in the embodiment 1. As shown in part (j) of FIG. 14, in this embodiment, in the post-rotation sequence, constant-current control of a transfer voltage at which a current value larger than 15 μA which is the transfer current in the image forming sequence is a target value is carried out. The pre-rotation sequence and the image forming sequence in this embodiment are similar to those in the embodiment 1, and therefore, description thereof will be omitted. In addition, in the post-rotation sequence in this embodiment, control of the main motor 10 and control of the laser exposure by the exposure provided 3 are similar to those in the embodiment 1, and therefore, description thereof will be omitted.

Charging Power Source

As shown in part (d) of FIG. 13, from a start timing T6 of the post-rotation sequence, similarly as the embodiment 1, the charging power source 11 lowers (decreases) the charging voltage stepwise from an eleventh charging voltage (C11=−950 V) to a fourteenth charging voltage (C14=−800

V) with the voltage fluctuation width of 50 V per 30 ms. Thereafter, similarly as in the embodiment 1, the charging power source 11 continues application of the fourteenth charging voltage (C14=−800 V) to a timing T11. Then, from the timing T11, the charging power source 11 lowers the charging voltage stepwise from a fifteenth charging voltage (C15=−750 V) to a nineteenth charging voltage (C19=−550 V) with a voltage fluctuation width of 50 V for 30 ms. Thereafter, the charging power source 11 applies the nineteenth charging voltage (C19=−550 V) for 30 ms and then turns off the charging voltage.

Developing Power Source

As shown in part (e) of FIG. 13, in the developing portion D, the developing power source 50 changes (lowers) the developing voltage stepwise in synchronism with stepwise lowering (falling) of the charging voltage.

Transfer Power Source

As shown in part (f) of FIG. 13, the transfer power source 14 carries out constant-current control of the transfer voltage with a target current of 30 mA until a timing T9 from a timing T8 when the surface of the photosensitive drum 1 positioned in the charging portion P at the timing T6 reaches the transfer portion T. Thereafter, the transfer power source 14 carries out the constant-current control of the transfer voltage, from the timing T9 to a timing T10, at which the target current is 26.25 μA. Then, the transfer power source 14 carries out the constant-current control of the transfer voltage, from the timing T10 to a timing T13, at which the target current is 22.5 μA. Thereafter, similarly, the transfer power source 14 carries out the constant-current control of the transfer voltage, from the timing T13 to a timing T14, at which the target current is 18.75 A, the constant-current control of the transfer voltage, from the timing T14 to a timing T15, at which the target current is 15 μA, the constant-current control of the transfer voltage, from the timing T15 to a timing T16, at which the target current is 11.25 μA, the constant-current control of the transfer voltage, from the timing T16 to a timing T17, at which the target control is 7.5 μA, and the constant-current control of the transfer voltage, from the timing T17 to a timing T18, at which the target current is 3.25 μA.

As shown in FIG. 9, the transfer portion surface potential drops by 400 V in the case where the transfer current is 30 μA. For that reason, as shown in part (j) of FIG. 14, in the case where the target current of the transfer current is 30 μA, the transfer portion surface potential becomes transfer portion surface potentials (Vt12=50 V to Vt13=0 V) obtained by dropping the developing portion surface potentials (Vd11=−450 V to Vd12=−400 V), respectively, shown in part (i) of FIG. 14 by 400 V. Thereafter, the transfer current is successively made small so that the surface potential of the photosensitive drum 1 is kept at 0 V. Thus, in this embodiment, a period in which the constant-current control of the transfer voltage is carried out in a manner such that the target current is made larger in the post-rotation sequence than in the image forming sequence is provided. By this, in this embodiment, there is no period corresponding to the period in which the application of the eighteenth charging voltage (C18=−600 V) in the embodiment 1 is continued, so that the post-rotation sequence can be ended in a shorter time than in the embodiment 1.

Thus, by controlling the transfer power source 14, as shown in part (j) of FIG. 14, the surface potential of the photosensitive drum 1 can be dropped to 0 V without making the polarity of the surface potential of the photosensitive drum 1 the positive polarity. Further, by controlling the transfer power source 14 as described above, compared with the embodiment 1, the time required for the post-rotation sequence can be shortened.

Comparison Result

Next, a comparison result between this embodiment (embodiment 2) and the embodiment 1 will be described. Comparison items are the same as those described in the embodiment 1. The width, the height, the depth, and the component (part) cost of the apparatus main assembly M are the same between this embodiment and the embodiment 1. On the other hand, the time required for the post-rotation sequence is shorter in this embodiment than in the embodiment 1. That is, the time required for the post-rotation sequence is 780 ms in the embodiment 1, and on the other hand, is 660 ms in this embodiment, so that the time required for the post-rotation sequence is shorter in this embodiment than in the embodiment 1 by 120 ms.

Thus, in this embodiment, the controller 205 controls the transfer voltage applying portion 14 so that a current larger in absolute value than during the image forming operation is caused to flow through between the transfer member 5 and the image bearing member 1 when at least one of the above-described first and second regions first passes through the transfer portion T.

As described above, according to this embodiment, not only an effect similar to the effect of the embodiment 1 can be obtained, but also the post-rotation operation can be performed in a shorter time than in the embodiment 1.

Next, another embodiment (embodiment 3) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

This embodiment further shortens the time required for the post-rotation sequence compared with the embodiments 1 and 2 described above, and is different from the embodiment 1 in that in the post-rotation sequence, after the surface potential of the photosensitive drum 1 is lowered stepwise, the surface potential of the photosensitive drum 1 is further lowered by the laser exposure by the exposure device 3.

Figure 15:
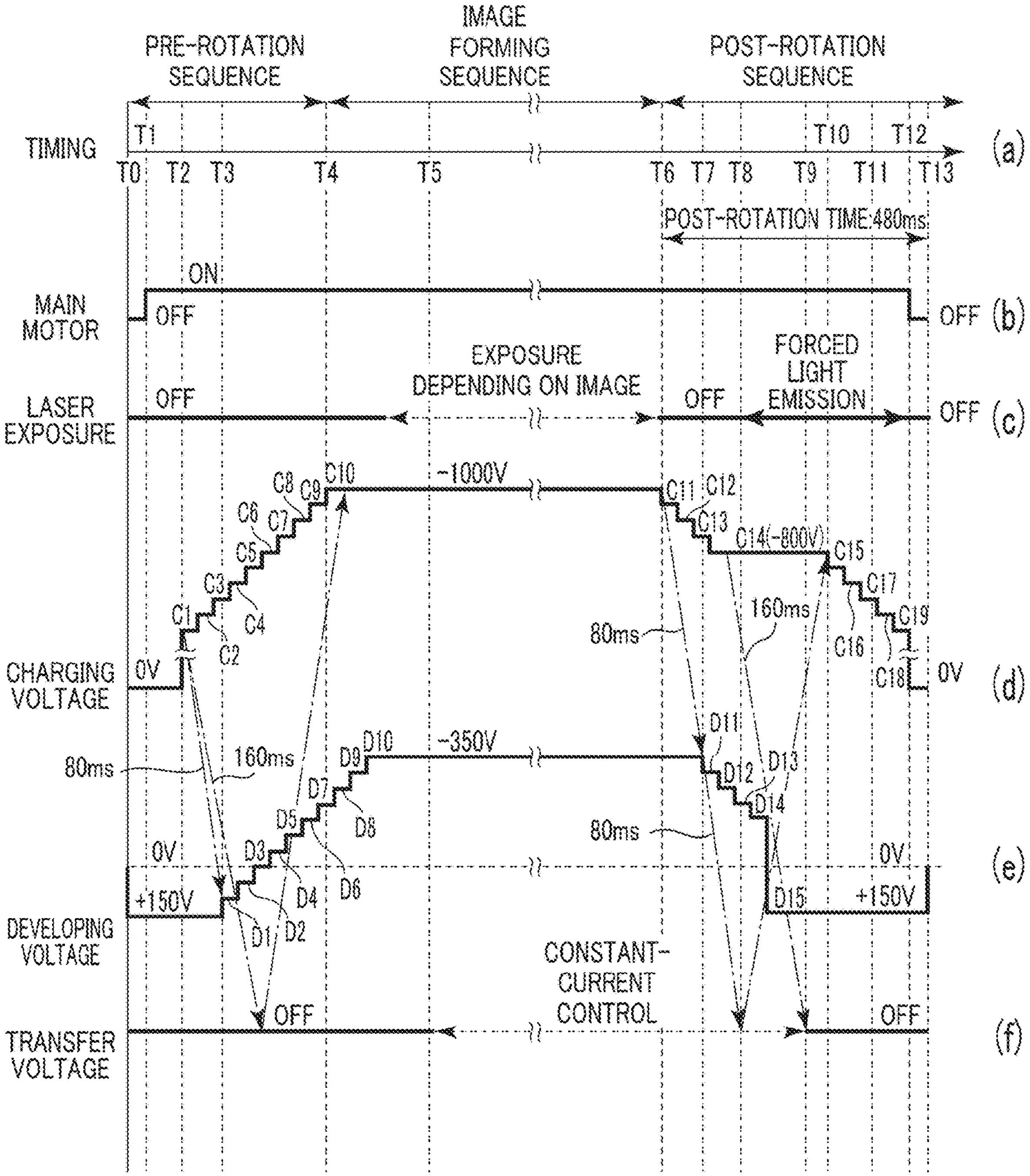
FIG. 15 is a timing chart of a print sequence in an embodiment 3.
Figure 16:
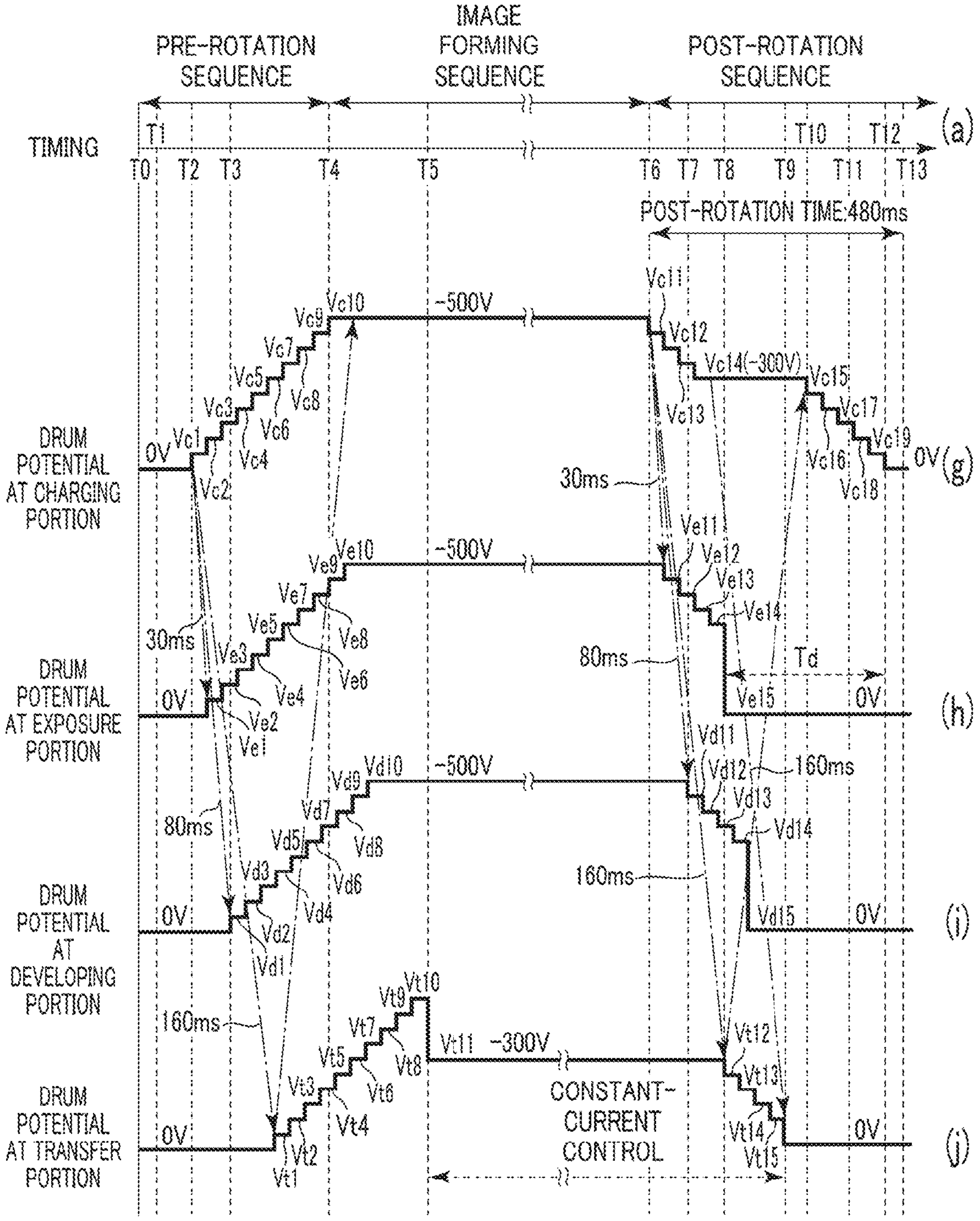
FIG. 16 is a timing chart of the print sequence in the embodiment 3.

The post-rotation sequence in this embodiment will be described. FIGS. 15 and 16 are timing charts of a print sequence in this embodiment, which correspond to FIGS. 6 and 7, respectively, in the embodiment 1. The pre-rotation sequence and the image forming sequence in this embodiment are similar to those in the embodiment 1, and therefore, description thereof will be omitted. In addition, in the post-rotation sequence in this embodiment, control of the main motor 10 is similar to that in the embodiment 1, and therefore, description thereof will be omitted.

Charging Power Source

As shown in part (d) of FIG. 13, from a start timing T6 of the post-rotation sequence, similarly as the embodiment 1, the charging power source 11 lowers (decreases) the charging voltage stepwise from an eleventh charging voltage (C11=−950 V) to a fourteenth charging voltage (C14=−800 V) with the voltage fluctuation width of 50 V per 30 ms. Thereafter, similarly as in the embodiment 1, the charging power source 11 continues application of the fourteenth charging voltage (C14=−800 V) to a timing T10. This timing T10 is a timing after a lapse of a time (Td=300 ms), from the timing T6 as a starting point, required for one-full circumference (75 mm) of the photosensitive drum 1. Then, from the timing T10, the charging power source 11 lowers the charging voltage stepwise from a fifteenth charging voltage (C15=−75 V) to an eighteenth charging voltage (C19=−550 V) with a voltage fluctuation width of 50 V for 30 ms. Thereafter, the charging power source 11 applies the nineteenth charging voltage (C19=−550 V) for 30 ms and then turns off the charging voltage.

Developing Power Source

As shown in part (e) of FIG. 15, in the developing portion D, the developing power source 50 changes (lowers) the developing voltage stepwise in synchronism with stepwise lowering (falling) of the charging voltage. That is, from the timing T7 when the stepwise lowering of the developing voltage is started, the developing power source 50 changes (lowers) the developing voltage from an eleventh developing voltage (D11=−300 V) to a fourteenth developing voltage (D14=−150 V) with the voltage fluctuation width per 30 ms. The developing power source 50 changes the developing voltage to a fifteenth developing voltage (D15=+150 V) after the fourteenth developing voltage (D14=−150 V) is applied for 30 ms. This timing when the developing voltage is changed to the fifteenth developing voltage (D15=+150 V) is a timing when the surface of the photosensitive drum 1 positioned in the exposure portion L at a timing T8 (described later) when the laser exposure by the exposure device 3 is started reaches the developing portion D. Thereafter, the developing power source 50 continues the application of the fifteenth developing voltage (D15=+150 V) until an end timing T13 of the post-rotation sequence, and then turns off the developing voltage. The eleventh to fourteenth developing voltages D11 to D14 are the developing voltages of the negative polarity which is the same polarity as the normal polarity of the toner, and the fifteenth developing voltage D15 is the developing voltage of the positive polarity which is the opposite polarity to the normal polarity of the toner.

Transfer Power Source

As shown in part (f) of FIG. 15, the transfer power source 14 continues the constant-current control of the transfer voltage with the target current of 15 μA until the timing T9. This timing T9 is a timing when the surface of the photosensitive drum 1 positioned in the exposure portion L at the timing T8 (described later) when the laser exposure by the exposure device 3 is started reaches the transfer portion T.

Laser Exposure

As shown in part (c) of FIG. 15, from the timing T8, the exposure device 3 starts the laser exposure at 0.45 $\mu J/cm^2$ which is an exposure amount larger than 0.2 $\mu J/cm^2$ which is the exposure amount of the exposure device 3 in the image forming sequence. This timing T8 is a timing when the surface of the photosensitive drum 1 positioned in the charging portion P at a timing of an end of a period of 30 ms from a start of application of the fourteenth charging voltage (C14=−800 V) to the charging roller 2 reaches the exposure portion L. As shown in part (h) of FIG. 16, the surface potential (exposure portion surface potential) of the photosensitive drum 1 in the exposure portion L lowers from −300 V to 0 V at the timing T8.

The laser exposure by the exposure device 3 is continued over a time (Td=300 ms), from the timing T8 to the timing T12, required for one-full circumference (75 mm) of the photosensitive drum 1. Then, from the timing T12, a stop operation of the main motor 10 is started, and then application of the fifteenth developing voltage (D15=+150 V) is continued until the timing T13 when the stop operation of the main motor 10 is completely ended.

Incidentally, the timing of the start of the laser exposure can be appropriately set so that Vback is not out of a predetermined range due to a difference between a falling characteristic of the surface potential of the photosensitive drum 1 by the laser exposure and a falling characteristic of the developing power source 50 or so that Vback becomes an allowable degree even in the case where the Vback is out of the predetermined range. Further, the laser exposure by the exposure device 3 may desirably be continued over a period of at least one-full circumference of the photosensitive drum 1. Further, in this embodiment, the exposure amount of the exposure device 3 in the post-rotation sequence was made larger than the exposure amount of the exposure device 3 in the image forming sequence. By this, in the post-rotation sequence, the surface of the photosensitive drum 1 can be stably electrically discharged. However, the present invention is not limited thereto, and when the surface of the photosensitive drum 1 can be sufficiently discharged in the post-rotation sequence, the exposure amount of the exposure device 3 in the post-rotation sequence may be the same as or different from the exposure amount of the exposure device 3 in the image forming sequence.

Thus, by subjecting the surface of the photosensitive drum 1 of which surface potential is lowered stepwise to the laser exposure by the exposure device 3, the surface potential of the photosensitive drum 1 can be dropped to 0 V in a shorter time than in the case where the surface of the photosensitive drum 1 is discharged by the transfer current. Further, by subjecting the surface of the photosensitive drum 1 of which surface potential is lowered stepwise to the laser exposure by the exposure device 3, even when there is the difference between the falling characteristic of the surface potential of the photosensitive drum 1 by the exposure device 3 and the falling characteristic of the developing power source 50, it becomes easy to prevent Vback from being out of the predetermined range.

Comparison Result

Next, a comparison result between this embodiment (embodiment 3) and the embodiments 1 and 2 will be described. Comparison items are the same as those described in the embodiment 1. The width, the height, the depth, and the component (part) cost of the apparatus main assembly M are the same between this embodiment and the embodiments 1 and 2. On the other hand, the time required for the post-rotation sequence is shorter in this embodiment than in the embodiment 2 (also even compared with the embodiment 1). Incidentally, the time required for the post-rotation sequence is shorter in this embodiment than even when compared with the above-described comparison example. That is, the time required for the post-rotation sequence is 780 ms in the embodiment 1, 660 ms in the embodiment 2, and 540 ms in the above-described comparison example, and on the other hand, is 480 ms in this embodiment, so that the time required for the post-rotation sequence is shorter in this embodiment than in the embodiment 1, the embodiment 2, and the comparison example by 300 ms, 180 ms, and 60 ms, respectively.

Thus, in this embodiment, the image forming apparatus 100 includes the exposure device 3 for forming the electrostatic latent image by exposing the surface of the image bearing member 1 at the exposure position downstream of the charging position P and upstream of the developing position D with respect to the rotational direction of the image bearing member 1, and the controller 205 controls the exposure device 3 so that an absolute value of the surface potential of the image bearing member 1 is made smaller than absolute values of the surface potentials of the above-described first and second regions at the time of first passing through the exposure position L by exposing the surface of the photosensitive drum 1 to light after the first and second regions first pass through the exposure position L and before the rotation of the image bearing member 1 is stopped. Further, in this embodiment, the controller 205 controls the developing voltage applying portion 50 so that the developing voltage of the opposite polarity to the normal polarity of the toner is applied when the region of the surface of the photosensitive drum 1 exposed to light by the exposure device 3 first passes through the developing position D.

As described above, according to this embodiment, not only an effect similar to the effect of the embodiments 1 and 2 can be obtained, but also the post-rotation operation can be performed in a further shorter time than in the embodiment 2.

According to the present invention, in the constitution in which the image bearing member and the developing member are rotated in contact with each other during the non-image forming operation, the fog during the post-rotation operation can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185329 filed on Nov. 18, 2022, which is hereby incorporated by reference herein in its entirety.

What is claimed is:

1. An image forming apparatus comprising:

a rotatable photosensitive drum;

a charging roller configured to electrically charge a surface of the photosensitive drum to a predetermined polarity at a charging position;

a developing roller contacting the surface of the photosensitive drum and configured to form a toner image by supplying toner to the surface of the photosensitive drum at a developing position downstream of the charging position with respect to a rotational direction of the photosensitive drum;

a transfer roller contacting the surface of the photosensitive drum and configured to transfer the toner image from the photosensitive drum onto a recording material at a transfer position downstream of the developing position and upstream of the charging position with respect to the rotational direction of the photosensitive drum;

a charging power source configured to apply a charging voltage of the same polarity as the predetermined polarity to the charging roller;

a developing power source configured to apply a developing voltage to the developing roller;

a transfer power source configured to apply a transfer voltage of an opposite polarity to the predetermined polarity to the transfer roller; and a control unit configured to control the charging power source, the developing power source, and the transfer power source, wherein the control unit carries out control so as to be capable of executing an image forming operation in which rotation of the photosensitive drum is started and stopped in a state that the developing roller contacts the photosensitive drum and in which the toner image to be transferred onto the recording material is formed and executing a post rotation operation until the rotation of the photosensitive drum after the image forming operation is ended is stopped, and wherein during the post rotation operation, the control unit controls the charging power source so that the charging voltage is changed stepwisely to a first charging voltage lower in absolute value than the charging voltage during the image forming operation and then to a second charging voltage lower in absolute value than the first charging voltage, and thereafter application of the charging voltage is ended, and when regions of the surface of the photosensitive drum having passed through the charging position under application of the first charging voltage and the second charging voltage are a first region and a second region, respectively, the control unit ends application of the developing voltage after changing the developing voltage to a first developing voltage when the first region first passes through the developing position and to a second developing voltage when the second region first passes through the developing position, the control unit controls the developing power source so that a potential difference between a surface potential of the first region when the first region first passes through the developing position and the first developing voltage and a potential difference between a surface potential of the second region when the second region first passes through the developing position and the second developing voltage are maintained within a predetermined range, and the control unit controls the transfer power source so that a current flows between the transfer roller and the photosensitive drum under application of the transfer voltage when each of the first region and the second region first passes through the transfer position and so that an absolute value of a surface potential of the photosensitive drum is made low when at least one of the first region and the second region first passes through the transfer position.

2. The image forming apparatus according to claim 1, wherein in a case that a potential difference between a surface potential when a region of the surface of the photosensitive drum which becomes the first region enters the charging position and the first charging voltage is greater than a discharge threshold and that a potential difference between a surface potential when a region of the surface of the photosensitive drum which becomes the second region enters the charging position and the second charging voltage is equal to the discharge threshold or less, the control unit controls the charging power source so that a time of application of the second charging voltage is made longer than a time of application of the first charging voltage.

3. The image forming apparatus according to claim 1, wherein the control unit controls the transfer power source so that a current with a value at which the photosensitive drum is not charged to an opposite polarity to the predetermined polarity flows between the transfer roller and the photosensitive drum when each of the first region and the second region first passes through the transfer position.

4. The image forming apparatus according to claim 1, wherein the control unit controls the transfer power source so that a current higher in absolute value than a current during the image forming operation flows between the transfer roller and the photosensitive drum when at least one of the first region and the second region first passes through the transfer position.

5. The image forming apparatus according to claim 1, further comprising an exposure device configured to form an electrostatic latent image by exposing the surface of the photosensitive drum to light at an exposure position downstream of the charging position and upstream of the developing position with respect to the rotational direction of the photosensitive drum, wherein during the post rotation operation, after the first region and the second region first pass through the exposure position and before the rotation of the photosensitive drum is stopped, the control unit controls the exposure device so that by exposing the surface of the photosensitive drum to light, an absolute value of the surface potential of the photosensitive drum is made lower than an absolute value of a surface potential of each of the first region and the second region when the first region and the second region first pass through the exposure position.

6. The image forming apparatus according to claim 5, wherein when a region of the surface of the photosensitive drum exposed to light by the exposure device first passes through the developing position, the control unit controls the developing power source so that a developing voltage of an opposite polarity to a normal polarity of the toner is applied.

7. The image forming apparatus according to claim 1, wherein the control unit controls the developing power source so that at least one of the first developing voltage and the second developing voltage is a voltage of an opposite polarity to a normal polarity of the toner.

8. The image forming apparatus according to claim 1, wherein the predetermined range is a range including a potential difference between a surface potential of a non-image portion of the surface of the photosensitive drum at the developing position during the image forming operation and the developing voltage.

9. The image forming apparatus according to claim 1, wherein a discharging device configured to electrically discharge the photosensitive drum on a side downstream of the transfer position and upstream of the charging position with respect to the rotational direction of the photosensitive drum is not provided.

10. The image forming apparatus according to claim 1, wherein in a state in which the charging voltage is not applied and in which a developing voltage of an opposite polarity to a normal polarity of the toner is applied, the control unit controls the charging power source and the developing power source so that the rotation of the photosensitive drum is started.

* * * * *